(12) United States Patent
Kawasaki

(10) Patent No.: US 7,613,568 B2
(45) Date of Patent: Nov. 3, 2009

(54) CRASH-SAFE VEHICLE CONTROL SYSTEM

(75) Inventor: Tomoya Kawasaki, Aichi-ken (JP)

(73) Assignee: Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 468 days.

(21) Appl. No.: 10/563,834

(22) PCT Filed: Jun. 25, 2004

(86) PCT No.: PCT/JP2004/009405

§ 371 (c)(1),
(2), (4) Date: Jan. 9, 2006

(87) PCT Pub. No.: WO2005/005206

PCT Pub. Date: Jan. 20, 2005

(65) Prior Publication Data

US 2006/0155469 A1     Jul. 13, 2006

(30) Foreign Application Priority Data

Jul. 11, 2003  (JP) .............................. 2003-195957
Jul. 11, 2003  (JP) .............................. 2003-195958

(51) Int. Cl.
*B60R 21/013* (2006.01)
*G08G 1/16* (2006.01)
*G01S 13/93* (2006.01)

(52) U.S. Cl. .......................... 701/301; 701/45; 342/70; 340/435

(58) Field of Classification Search .................... None
See application file for complete search history.

(56) References Cited

U.S. PATENT DOCUMENTS 5,424,726 A * 6/1995 Beymer ...................... 340/902
5,552,986 A   9/1996 Omura et al.
5,841,366 A  11/1998 Yamamoto et al.

(Continued)

FOREIGN PATENT DOCUMENTS

DE          199 54 536        5/2001

(Continued)

*Primary Examiner*—Michael J. Zanelli
(74) *Attorney, Agent, or Firm*—Finnegan, Henderson, Farabow, Garrett & Dunner, LLP

(57) ABSTRACT

A crash-safe vehicle control system for controlling operating devices of an own vehicle such as a vehicle decelerating device and an occupant protecting device, on the basis of information on at least one preceding object existing in front of the own vehicle. The vehicle control system is arranged to effect at least one of a non-first-preceding-object-information-dependent control and a width-related-information-dependent control. The non-first-preceding-object-information-dependent control is a control of the operating devices on the basis of non-first-preceding-object information detected by the present system per se, in the presence of a high possibility of crashing of the own vehicle with a first preceding vehicle existing immediately in front of the own vehicle. The non-first-preceding-object information relates to at least one non-first preceding object each existing in front of the first preceding vehicle. The width-related-information-dependent control is a control of the operating devices on the basis of at least one of width-related information relating to a width and a widthwise position of each specific object selected from the above-indicated at least one preceding object.

24 Claims, 17 Drawing Sheets

U.S. PATENT DOCUMENTS

| | | | |
|---|---|---|---|
| 5,995,037 A * | 11/1999 | Matsuda et al. | 342/71 |
| 6,085,151 A | 7/2000 | Farmer et al. | |
| 6,114,951 A * | 9/2000 | Kinoshita et al. | 340/436 |
| 6,269,308 B1 | 7/2001 | Kodaka et al. | |
| 6,311,123 B1 * | 10/2001 | Nakamura et al. | 701/96 |
| 6,653,935 B1 | 11/2003 | Winner et al. | |
| 6,728,617 B2 * | 4/2004 | Rao et al. | 701/45 |
| 6,816,084 B2 * | 11/2004 | Stein | 340/903 |
| 6,889,786 B2 * | 5/2005 | Watanabe et al. | 180/167 |
| 7,365,769 B1 * | 4/2008 | Mager | 348/113 |
| 2001/0031068 A1 | 10/2001 | Ohta et al. | |
| 2002/0198632 A1 * | 12/2002 | Breed et al. | 701/1 |
| 2003/0045991 A1 * | 3/2003 | Isogai et al. | 701/96 |
| 2004/0176900 A1 * | 9/2004 | Yajima | 701/96 |
| 2004/0193351 A1 * | 9/2004 | Takahashi et al. | 701/70 |
| 2005/0004760 A1 * | 1/2005 | Urai et al. | 701/301 |

FOREIGN PATENT DOCUMENTS

| | | | |
|---|---|---|---|
| JP | A-5-238367 | | 9/1993 |
| JP | 6-229759 | * | 8/1994 |
| JP | A-10-181487 | | 7/1998 |
| JP | 11-15952 | | 1/1999 |
| JP | 11-203598 | | 7/1999 |
| JP | B2-2946995 | | 7/1999 |
| JP | A-11-353599 | | 12/1999 |
| JP | 2000-062555 | | 2/2000 |
| JP | 2000-121730 | | 4/2000 |
| JP | A-2000-095130 | | 4/2000 |
| JP | A-2000-142321 | | 5/2000 |
| JP | A-2001-296357 A | | 10/2001 |
| JP | 2002-234418 | | 8/2002 |
| JP | A-2002-296350 | | 10/2002 |
| JP | A-2003-151095 | | 5/2003 |
| JP | 2003-175797 | | 6/2003 |

* cited by examiner

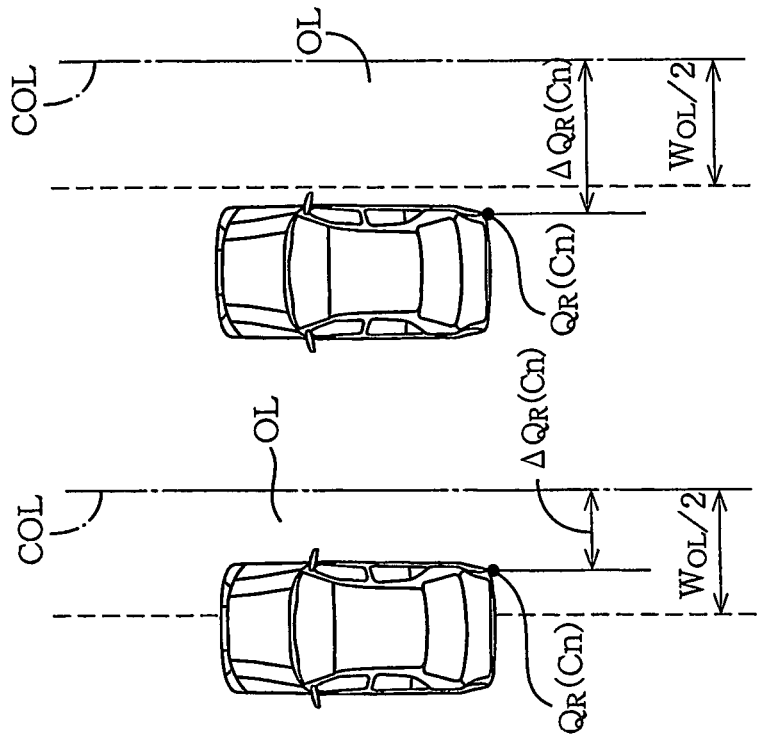
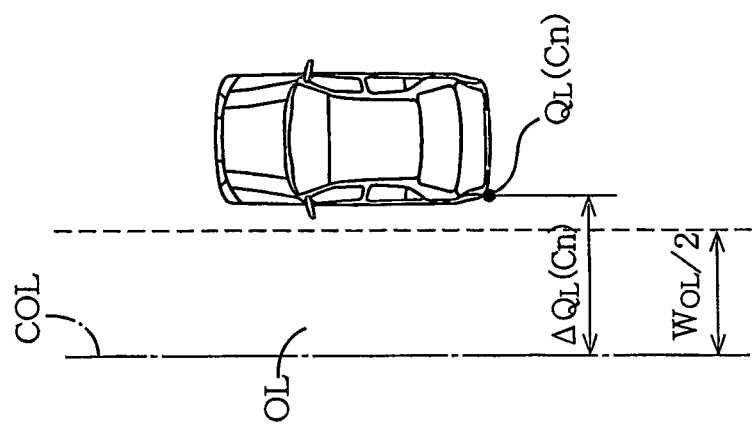
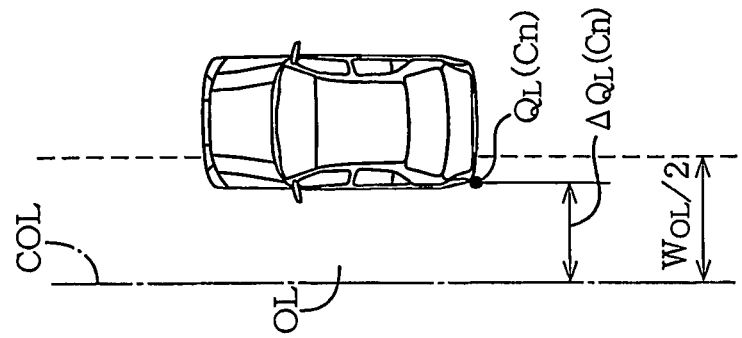
FIG.11A  FIG.11B  FIG.11C  FIG.11D $Lap(\%) = W_S/W_{C0} \times 100\%$

CRASH-SAFE VEHICLE CONTROL SYSTEM

TECHNICAL FIELD

The present invention relates to a crash-safe vehicle control system for effecting so-called "ACC" and "PCS" controls, and any other controls of an automotive vehicle, so as to deal with a crashing of the vehicle, in particular, to prevent the crashing and protect occupants of the vehicle upon crashing of the vehicle with any object.

BACKGROUND ART

In the field of control of vehicles such as automobiles, a progress has been made in recent years in development and research of control technologies to deal with a crashing of an own vehicle with preceding objects existing in front of the own vehicle. Examples of such control technologies include a control for preventing or avoiding the crashing of the own vehicle with the preceding objects, and a control for protecting occupants of the own vehicle upon crashing of the own vehicle. A typical and well-known control technology of the former type of control is a so-called "ACC" (Auto-Cruise Control, or Adaptive-Cruise Control), which is generally a control technique to adjust an output of a drive power source such as an engine device of the own vehicle, so that the own vehicle is cruising following or tracing a preceding vehicle so as to maintain a predetermined relationship such as a distance between the two vehicles. On the other hand, a typical and well-known control technology of the latter type of control is a so-called "PCS" (Pre-Crash-Safety) control, which is generally a control technique to forecast a crashing of the own vehicle and activate seatbelts and other occupant protective devices prior to the crashing. These crash-safe vehicle control technologies are desired to be more practically effective to deal with the vehicle crashing.

For example, JP-A-2000-142321 and JP-B2-2946995 disclose techniques for detecting an object existing in front of the own vehicle, determine a possibility of crashing of the own vehicle with the object on the basis of detected distance and relative speed between the own vehicle and the object, and activating pre-tensioners of seatbelts. These techniques are common crash-safe controls to deal with a crashing of the own vehicle with the preceding objects. To effect the crash-safe controls, it is desirable to accurately detect the positional relationship between the own vehicle and preceding objects which have a high possibility of crashing with the own vehicle. JP-A-2003-296350 discloses an example of a technique for accurately obtaining the positions of ambient objects surrounding the own vehicle or existing in the neighborhood of the own vehicle.

The conventional crash-safe controls are generally effected on the basis of the condition of a vehicle immediately preceding the own vehicle, as disclosed in JP-A-2000-95130. On the other hand, JP-A-5-238367 discloses a crash-safe control of the own vehicle, wherein information on a second preceding vehicle running in front of a first preceding vehicle immediately preceding the own vehicle is obtained to determine a possibility of collision between the first and second preceding vehicles, and to control the own vehicle so as to avoid its crashing.

The above-identified publication JP-A-2003-296350 disclosing the technique relating to a device arranged to detect a width and other information of each object is unclear as to how this technique is practically embodied to effect crash-safe controls of the own vehicle. The detecting device disclosed therein is operable on an assumption that each object such as a preceding vehicle running in front of the own vehicle has a wave reflecting portion or reflector, so that the width and other information of the preceding vehicle can be detected on the basis of the wave reflected from the reflector. However, automotive vehicles presently available do not have such a specific reflector. That is, the technique in question is not practically effective, and requires future establishment of an infrastructure that permits practical utilization of this technique.

The technique disclosed in the above-identified publication JP-A-5-238367 is considered an advanced crash-safe vehicle control technique in its capability of avoiding multiplex crashing of a plurality of vehicles running in succession. However, this technique requires a transmitter provided on the first preceding vehicle running immediately in front of the own vehicle, or on any ground communication facility, so that information on the second and further preceding vehicles preceding the first preceding vehicle is received from the transmitter by the own vehicle. In this respect, this technique is not practically effective, either, and requires future establishment of an infrastructure for communication between the vehicles and between the own vehicle and the ground communication facility, which permits the own vehicle to obtain running speeds of the preceding vehicles and distances between the own vehicle and the preceding vehicles.

DISCLOSURE OF THE INVENTION

It is therefore an object of the present invention to provide a crash-safe vehicle control system which permits practically effective crash-safe controls of an automotive vehicle. This object may be achieved according to the principle of this invention, which provides a crash-safe vehicle control system for controlling an operating device of an own vehicle such as a vehicle decelerating device and an occupant protecting device, on the basis of information on at least one preceding object existing in front of the own vehicle, the crash-safe vehicle control system being characterized by effecting at least one of a non-first-preceding-object-information-dependent control and a width-related-information-dependent control. The term "non-first-preceding-object-information-dependent control" is interpreted to mean a control of the operating device on the basis of non-first-preceding-object information detected by the crash-safe vehicle control system per se, in the presence of a high possibility of crashing of the own vehicle with a first preceding vehicle existing immediately in front of the own vehicle. The non-first-preceding-object information relates to at least one non-first preceding object each existing in front of the first preceding vehicle. The term "width-related-information-dependent control" is interpreted to mean a control of the operating device on the basis of width-related information relating to at least one of a width and a widthwise position of at least one specific object selected from the above-indicated at least one preceding object.

Described briefly, the non-first-preceding-object-information control is a crash-safe vehicle control effected by the crash-safe vehicle control system, by using a device provided on the own vehicle, for example, to detect the condition of each non-first preceding object existing in front of a first preceding vehicle (a first preceding object) running immediately in front of the own vehicle, and control the own vehicle on the basis of the detected condition of the non-first preceding object. Since the non-first-preceding-object information used for the non-first-preceding-object-information-dependent control can be obtained by only the device provided on the own vehicle as a part of the crash-safe vehicle control system, the system is practically effective to assure the safety of the own vehicle and its occupants.

Described briefly, the width-related-information-dependent control is a crash-safe vehicle control effected on the basis of at least one of the width dimension and widthwise position of a preceding object preceding the own vehicle, as viewed in the direction of width of the own vehicle, for example. The width-related information is useful for accurately recognizing the positional relationship of the preceding object with respect to the own vehicle. The crash-safe vehicle control system capable of effecting the width-related-information-related control is highly efficient and practically effective to assure the safety of the own vehicle and its occupants.

The present invention may be embodied in various forms of the crash-safe vehicle control system, which will be described below in detail under the heading "DETAILED DESCRIPTION OF THE INVENTION". Those forms of the crash-safe vehicle control system have respective various features and advantages, which enable the system to be practically effective to assure the safety of the own vehicle and its occupants.

BRIEF DESCRIPTION OF THE DRAWINGS

FIGS. 11A-11D are views for explaining a determination as to whether each specific object exits in a running lane of the own object;

DETAILED DESCRIPTION OF THE INVENTION

Figure 1:
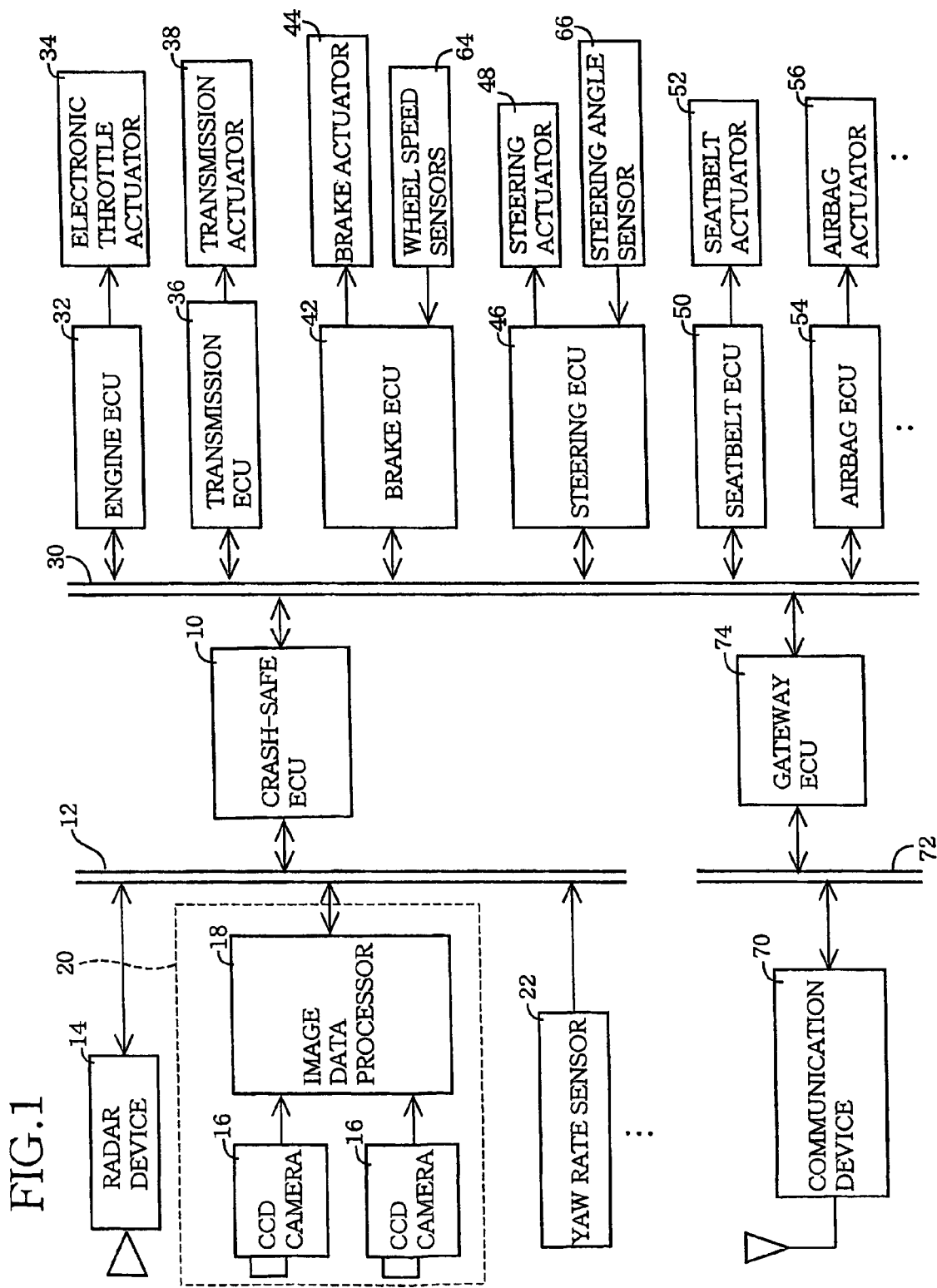
FIG. 1 is block diagram showing an overall arrangement of a crashing-management vehicle control system constructed according to one embodiment of this invention.

There will be described in detail various forms of the crash-safe vehicle control system, which are considered inventive according to the principle of this invention. Each of these forms of the invention is numbered like the appended claims and depends from the other form or forms, where appropriate, for easier understanding of the technical features disclosed in the present specification. It is to be understood that the present invention is not limited to the technical features or any combinations thereof which will be described, and shall be constructed in the light of the following descriptions of the various forms and a preferred embodiment of the invention. It is to be further understood that a plurality of elements or features included in any one of the following forms of the invention are not necessarily provided all together, and that the invention may be embodied with selected at least one of the elements or features described with respect to the same form. It is to be still further understood that Japanese Patent Application Nos. 2003-195957 and 2003-195958 on which the present application is based are incorporated hereinto by reference.

(1) A crash-safe vehicle control system for controlling an own vehicle, comprising:

an object-information obtaining device operable to obtain object information on each of at least one preceding object existing in front of the own vehicle, the object information including information relating to a position of each preceding object relative to the own vehicle;

an operating device operable in the presence of a high possibility of crashing of the own vehicle with one of the at least one preceding object; and a crash-safe control device operable to control the operating device on the basis of the object information on the at least one preceding object obtained by the object-information obtaining device, and wherein the crash-safe control device is operable to effect at least one of: (a) a non-first-preceding-object-information-dependent control of the operating device, on the basis of non-first-preceding-object information obtained by the object-information obtaining device, in the presence of a high possibility of crashing of the own vehicle with a first preceding vehicle which is one of the at least one preceding object and which exists immediately in front of the own vehicle, the non-first-preceding-object information relating to at least one non-first preceding object each of which is one of the at least one preceding object and exists in front of the first preceding vehicle, and (b) a width-related-information-dependent control of the operating device on the basis of width-related information relating to at least one of a width and a widthwise position of at least one specific object selected from the at least one preceding object.

The crash-safe vehicle control system constructed according to the above-described form (1) is a fundamental form of the present invention. As briefly described above, the non-first-preceding-object-information control is a crash-safe vehicle control such as an ACC control and a PCS control of the operating device effected by the present crash-safe vehicle control system, by using a radar device or any other suitable device provided on the own vehicle, for example, to detect the condition of each non-first preceding object existing in front of a first preceding vehicle (a first preceding object) running immediately in front of the own vehicle, and control the operating device on the basis of the detected condition of the non-first preceding object, so as to avoid a crashing of the own vehicle with the first preceding vehicle and to protect occupants of the own vehicle if the crashing takes place. Since the non-first-preceding-object-information-dependent control is based on the non-first-preceding-object information, which can be obtained by only the device provided on the own vehicle as a part of the crash-safe vehicle control system, the present crash-safe vehicle control system can deal with a multiplex crashing involving the own vehicle, the first preceding vehicle and at least one non-first preceding vehicle, and is practically effective to assure the safety of the own vehicle and its occupants. Further, a possibility of crashing of the own vehicle with the first preceding vehicle can be determined with high accuracy on the absis of the non-first-preceding-object information.

As also briefly described above, the width-related-information-dependent control is a crash-safe vehicle control such as the ACC and PCS controls of the operating device effected on the basis of at least one of the width dimension and widthwise position of a preceding object preceding the own vehicle, as viewed in the direction of width of the own vehicle, for example. The direction of width of the own vehicle is perpendicular to the longitudinal direction of the own vehicle. The width-related information is useful for accurately recognizing the positional relationship of the preceding object with respect to the own vehicle. The crash-safe vehicle control system capable of effecting the width-related-information-related control is highly efficient and practically effective to assure the safety of the own vehicle and its occupants.

The crash-safe control device, which is a core of the present crash-safe vehicle control system, may be principally constituted by a computer arranged to effect the ACC, PCS and any other crash-safe controls of the operating device. The ACC control is effected to enable the own vehicle to follow or trace a preceding vehicle, at a running speed within a predetermined range, so as to maintain a predetermined relationship such as a distance between the two vehicles, for avoiding a crashing of the own vehicle with the preceding vehicle. On the other hand, the PCS control is effected in the presence of a possibility of a crashing of the own vehicle with a preceding vehicle, to initiate an operation of an occupant protective device (or set the occupant protecting device ready for operation), or apply a brake to the own vehicle, prior to the crashing. While various types of controls such as the ACC and PCS controls are available as the crash-safe controls of the operating device, the crash-safe control device of the present system may be arranged to effect all or a plurality of those crash-safe controls, or a selected one of those crash-safe controls. In the present system, the operating device is operable in the presence of a high possibility of crashing of the own vehicle with one of the at least one preceding object (which one preceding object may be a first preceding vehicle immediately preceding the own vehicle). The degree of the "high possibility" depends on the specific type of the crash-safe control to be effected, and cannot be generally defined. That is, the threshold of the "possibility of crashing" which triggers the crash-safe control device varies depending upon the specific type of the crash-safe control. For instance, the crash-safe control device generally initiates the PCS control of the operating device when the possibility of crashing of the own vehicle with a preceding object has exceeded a threshold that is higher than a threshold for the ACC control.

To effect the crash-safe control, it is convenient or reasonable to determine the possibility of crashing of the own vehicle with the preceding object, on the basis of a distance between the own vehicle and the preceding object, a time up to an expected moment of arrival of the own vehicle at the present position of the preceding object, a time up to an expected moment of crashing of the own vehicle with the preceding object, and any other similar control parameters. For example, the first preceding object (first preceding vehicle) which exists immediately in front of the own vehicle generally has a considerably high possibility of direct crashing with the own vehicle. Accordingly, the possibility of crashing of the own vehicle with the first preceding object can be accurately determined on the basis of the control parameters described above. The above-described distance, and the arrival time and crashing time may be referred to as "crash-related relationship parameters" or simply as "relationship parameters", which represent the relationship between the own vehicle and the preceding object in question. Described more specifically, the arrival time is defined as a time required for the own vehicle to arrive at the present position of the preceding object at the present running speed of the own vehicle, and is not influenced by a moving or running speed of the preceding object, while on the other hand, the crashing time is defined as a time required for the own vehicle to collide with the preceding object while the relative speed therebetween is held constant. Where the preceding object is a preceding vehicle, the above-described distance may be called "a vehicle-to-vehicle distance", and the above-described arrival time may be called "a vehicle-to-vehicle time" or "a critical time".

To control the operating device on the basis of the determined possibility of crashing of the own vehicle with the preceding object, the operation mode of the operating device (including the condition for initiating an operation, and the state of operation of the working device) is determined on the basis of the determined possibility of crashing, and the operating device is controlled in the determined operation mode. For instance, the moment of initiation of an operation of the operating device is advanced when the possibility of crashing is comparatively high, with respect to the moment of initiation when the possibility is comparatively low. Further, the operating device is controlled such that an effect to be achieved by the operation of the operating device is larger when the possibility of crashing is comparatively high, than when the possibility is comparatively low. Both the moment of initiation of the operation of the working device and the effect to be achieved by the operation may be controlled as described above. There will be described the crash-safe controls of the operating device so as to advance the moment of initiation of its operation and/or increase the effect to be achieved by the operation with an increase in the possibility of crashing.

The non-first-preceding-object-information-dependent control effected by the crash-safe control device may be arranged to determine the possibility of crashing of the own vehicle with the first preceding vehicle on the basis of the condition of the non-first-preceding-object information, in addition to or in place of the relationship parameters described above, so that the crash-safe control device controls the operating device on the basis of the determined possibility of crashing. For example, the crash-safe control device estimates a relationship between the own vehicle and the non-first preceding object on the basis of the relationship parameters representative of the relationship therebetween, determines a possibility of crashing of the own vehicle with the first preceding vehicle (existing between the own vehicle and the non-first preceding object,) on the basis of the estimated relationship, and controls the operating device on the basis of the determined possibility of crashing of the own vehicle with the first preceding vehicle. In another example, the crash-safe control device estimates the possibility of crashing between the non-first preceding object and the first preceding vehicle, on the basis of the relationship parameters of the non-first preceding object and the first preceding vehicle, such as a moving speed of the non-first preceding object (a running speed of the second preceding vehicle which precedes the first preceding vehicle), and a deceleration value of the non-first preceding object where this object is a moving object. In this example, the crash-safe control device determines the possibility of crashing of the own vehicle with the first preceding vehicle on the basis of the estimated possibility of crashing between the first preceding vehicle and the non-first preceding object, and controls the operating device on the basis of the determined possibility of crashing of the own vehicle with the first preceding vehicle. The crash-safe controls as described above permit significant reduction of an operational delay of the operating device and its operation in a more optimum state, as compared with the crash-safe control based on the possibility of crashing of the own vehicle with the first preceding vehicle which is determined on the basis of only the relationship between the own vehicle and the first preceding vehicle.

The width-related information used for the width-related-information-dependent control of the operating device by the crash-safe control device is an information relating to the position of at least one preceding object in the direction of width of the own vehicle, more specifically, the width of each preceding object (width dimension of a preceding vehicle), and an amount of deviation or offset of each preceding object from the own vehicle in the direction of width of the own vehicle (e.g., position of a selected portion of each preceding object from a reference position of the own vehicle in the width direction of the own vehicle). Those items of the width-related information are initially obtained by a width-related-information obtaining device (which will be described), and may be processed by the crash-safe control device to obtain another item or other items of the width-related information. For instance, the width-related-information obtaining device initially obtains a width of the preceding object and a widthwise center position of the width, which are processed, by calculation, for example, by the crash-safe control device to obtain an widthwise end position of the preceding object. It is to be understood that the width-related information used for the width-related-information-dependent control includes the information thus obtained by the crash-safe control device by processing of the information initially obtained by the width-related-information obtaining device.

The crash-safe control device of the crash-safe vehicle control system may include (a) an object-information obtaining portion arranged to receive the object information from the object-information obtaining device, (b) a control-object specifying portion arranged to specify at least one specific preceding object each as a control object for a crash-safe control of the operating device, on the basis of the object information received by the object-information obtaining portion, (c) an operation-mode determining portion arranged to determine a control mode (e.g., a condition for initiating an operation and a state of the operation) of the operating device, on the basis of the object information relating to each specific preceding object specified by the control-object specifying portion, and (d) an operation control portion arranged to control the operation of the operating device in the control mode determined by the control-mode determining portion. Where the non-first-preceding-object-information-dependent control of the operating device is effected under the control of the crash-safe control device constructed as described above, the non-first-preceding object may be specified by the control-object specifying portion, as one of the at least one specific preceding object. As described below in detail, the control-object specifying portion of the crash-safe control device may be arranged to specify the at least one specific preceding object on the basis of the width-related information, and the control-mode determining portion may be arranged to determine the control mode of the operating device on the basis of the width-related information.

The operating device to be controlled by the crash-safe control device is not particularly limited, and may include any vehicle decelerating device constructed to decelerate the own vehicle, any occupant protective device constructed to protect the occupants (operator and passengers) of the own vehicle upon crashing of the own vehicle, and any other device that is controllable in a crash-safe control fashion. While a typical example of the vehicle decelerating device is a brake device (e.g., hydraulically operated brake device), the vehicle decelerating device may include other devices such as an engine device, an electric motor and any other type of a drive power source, which is capable of generating an engine brake or a regenerative brake, and a transmission device which is shifted down to increase the braking force to be generated by the drive power source. The occupant protective device includes a seatbelt device (preferably provided with pre-tensioners), an airbag device, a steering device including a steering column provided with a shock-absorbing mechanism, and a pedal device such as a brake pedal device, which is arranged to be displaced so as to reduce an impact which would act on the operator of the own vehicle in the event of a crashing of the own vehicle. The operating device of the present crash-safe vehicle control system may also include; a steering device provided with a steering mechanism operable to avoid a crashing of the own vehicle; a suspension device constructed to permit a change of the body height from the ground, so as to reduce an impact which would act on the occupants; a rear indicator device such as a brake lamp, and a communication device, for informing the trailing vehicles of a risk of crashing thereof with the own vehicle.

The "at least one preceding object" the information of which is obtained by the object-information obtaining device may be a moving object such as a running vehicle, or a stationary object such as a vehicle stopped on a roadway, and an obstacle or any other object left or installed on a roadway. The first preceding vehicle whose possibility of crashing with the own vehicle is used for the non-first-preceding-object-information-dependent control is the first object which exists immediately in front of the own vehicle and with which the own vehicle may directly collide with the highest possibility. While the first preceding vehicle is a vehicle running immediately in front of the own vehicle, the non-first preceding object existing in front of the first preceding vehicle is not limited to a preceding running vehicle, and may be a stationary object. Each preceding object, the information of which is used to avoid or deal with a crashing of the own vehicle, is preferably an own-lane object lying on an own lane of the own vehicle, which is an imaginary running lane of the own vehicle which has a predetermined width and which is not necessarily an actual running lane marked on the roadway surface. The first preceding vehicle and the non-first preceding object are desirably selected from the own-lane objects.

The at least one non-first preceding object whose information is used for the non-first-preceding-object-information-dependent control may be one non-first preceding object existing in front of the first preceding vehicle, or a plurality of non-first preceding objects existing in front of the first preceding vehicle. For instance, the non-first-preceding-object-information-dependent control may be effected on the basis of a possibility of crashing of the own vehicle and the first preceding vehicle, which is determined on the basis of the conditions of a plurality of non-first preceding vehicles existing in front of the first preceding vehicle.

The at least one specific object whose width-related-information is obtained for the width-related-information-dependent control is selected from the at least one preceding object whose information is obtained by the object-information obtaining device. All of the at least one preceding object may be selected as the at least one specific object, or a selected one or ones of the at least one preceding object may be selected as the specific object or objects. Since the possibility of crashing of the own vehicle directly with the first preceding object is the highest, the at least one specific object preferably includes at least the first preceding object. Where the non-first-preceding-object-information-dependent control and the width-related-information-dependent control are both effected by the crash-safe control device, the at least one specific object may include at least one non-first preceding object.

The object-information obtaining device of the present crash-safe vehicle control system according to the above-described form (1) of this invention is not particularly limited in construction. Where the crash-safe control device is arranged to effect at least the non-first-preceding-object-information-dependent control, the object-information obtaining device is required to include a device capable of detecting the at least one non-first preceding object. Since each non-first preceding object exists in front of the first preceding vehicle existing immediately in front of the own vehicle, the object-information obtaining device preferably includes a device capable of detecting a plurality of detecting a plurality of preceding objects lying on an own lane on which the own vehicle is running. Where the crash-safe control device is arranged to effect at least the width-related-information-dependent control, the object-information obtaining device is required to include a device capable of obtaining the width-related information.

(2) The crash-safe vehicle control system according to the above-described form (1), wherein the crash-safe control device is operable to effect at least the non-first-preceding-object-information-dependent control.

The crash-safe vehicle control system according to the above-described form (2) of the invention is capable of effecting the non-first-preceding-object-information-dependent control described above, and the following forms (3)-(20) of the crash-safe vehicle control system relate to various arrangements for effecting the non-first-preceding-object-information-dependent control.

(3) The crash-safe vehicle control system according to the above-described form (2), wherein the object-information obtaining device includes an object-information obtaining radar device operable to detect a plurality of preceding objects which exist in front of the own vehicle and which lie on an own lane on which the own vehicle is to run, the object-information obtaining radar device being operable to obtain the object information on each of the above-indicated at least one preceding object.

In the crash-safe vehicle control system according to the above-described form (3) of the present invention, the object-information obtaining device includes an object-information obtaining radar device capable of detecting the preceding objects, so that the object-information obtaining device of the system obtains the object information of the at least one preceding object. This radar device is operable to obtain the object information of the plurality of preceding objects lying on the own lane of the own vehicle, that is, capable of detecting at least one non-first preceding object which exists in front of the first preceding vehicle existing immediately in front of the own vehicle. Therefore, the object-information obtaining device can obtain the object information effective for the non-first-preceding-object-information-dependent control.

The crash-safe vehicle control system according to the above-described form (3) is defined in an independent format drafted as follows:

A crash-safe vehicle control system for controlling an own vehicle, comprising:

an object-information obtaining device including a radar device operable to detect a plurality of preceding objects which exist in front of the own vehicle and which lie on an own lane on which the own vehicle is to run, the object-information obtaining device being operable to obtain object information on each of the plurality of preceding objects, the object information including information relating to a position of each preceding object relative to the own vehicle;

an operating device operable in the presence of a high possibility of crashing of the own vehicle with one of the at least one preceding object; and a crash-safe control device operable to control the operating device on the basis of the object information on the at least one preceding object obtained by the object-information obtaining device, and wherein the crash-safe control device is operable to control the operating device, on the basis of non-first-preceding-object information obtained by the object-information obtaining device, in the presence of a high possibility of crashing of the own vehicle with a first preceding vehicle which is one of the plurality of preceding objects and which exists immediately in front of the own vehicle, the non-first-preceding-object information relating to at least one non-first preceding object each of which is one of the plurality of preceding objects and exists in front of the first preceding vehicle.

It is to be understood that the crash-safe vehicle control system defined above in the independent format may include features of the following forms (4)-(20) of the crash-safe vehicle control system.

(4) The crash-safe vehicle control system according to the above-described form (3), wherein the radar device of the object-information obtaining device is a millimeter wave type radar device.

The millimeter wave type radar device is arranged to generate a millimeter wave as a detecting wave having a comparatively long wavelength. Unlike a radar device utilizing a laser, the millimeter wave type radar device is able to detect a non-first preceding object at least partly hidden by the first preceding vehicle, by utilizing a diffraction phenomenon or reflection of the millimeter wave by a roadway surface. Accordingly, the millimeter wave type radar device is capable of obtaining information on the non-first preceding object, such as a distance, relative angle and relative speed between the non-first preceding object and the first preceding vehicle.

As discussed below in detail, the radar device is preferably an FM-CW radar device capable of a scanning operation by a digital-beam forming (DBF) technique, for detecting the preceding object.

(5) The crash-safe vehicle control system according to any one of the above-described forms (2)-(4), wherein the object-information obtaining device is operable to obtain, as the object information, at least one of a distance, a relative angle and a relative speed between each of the at least one preceding object and the own vehicle.

The above-described items of the object information obtained by the object-information obtaining device are effective for the crash-safe controls, as information relating to the relationship between the own vehicle and each preceding object. For example, those items of the object information can be used to determine whether each preceding object exists on an own lane on which the own vehicle is to run, or to obtain information such as the arrival time and crashing time described above. The radar device is preferably arranged to be able to concurrently obtain the above-indicated three items of the object information, for improved operating response and efficiency of the system.

(6) The crash-safe vehicle control system according to any one of the above-described forms (2)-(5), wherein the object-information obtaining device obtains the information on the first preceding vehicle, as the object information on one of the above-indicated at least one preceding object, and the crash-safe control device is operable to control the operating device on the basis of the information on the first preceding vehicle, which is obtained by the object-information obtaining device.

In view of a fact that the own object has the highest possibility of crashing directly with the first preceding vehicle, it is desirable to effect the crash-safe controls of the operating device on the basis of the information relating to the first preceding vehicle, which is obtained by the object-information obtaining device, as in the crash-safe vehicle control system according to the above-described form (6) of this invention. For instance, the ACC and PCS controls of the operating device can be effected on the basis of the relationship parameters of the own vehicle and the first preceding vehicle, which relationship parameters are obtained on the basis of the distance and relative speeds between the own vehicle and the first preceding vehicle. Where the crash-safe vehicle control system is arranged to effect such crash-safe controls further depending on the specific state of the non-first preceding object, the crash-safe controls may be initiated when the obtained relationship parameters satisfy predetermined conditions, and the control mode of the operating device may be changed on the basis of the information relating to the non-first preceding object.

(7) The crash-safe vehicle control system according to any one of the above-described forms (2)-(6), wherein the crash-safe control device is operable to estimate a possibility of crashing between the first preceding vehicle and the at least one non-first preceding object, and control the operating device on the basis of the estimated possibility of crashing between the first preceding vehicle and the at least one non-first preceding object.

When an estimated possibility of crashing between the first preceding object and any non-first preceding object is higher, it is possible to determine that the own vehicle has a high possibility of crashing with the first preceding vehicle. Where the first preceding vehicle has a crashing with the non-first preceding object or is abruptly braked to avoid a crashing with the non-first preceding object, there is a high possibility of crashing of the own vehicle with the first preceding vehicle. In the crash-safe vehicle control system according to the above-described form (7) of this invention, the crash-safe control of the operating device can be effected upon determination of a high possibility of the own vehicle with the first preceding vehicle, on the basis of an estimated high possibility of crashing of the first preceding vehicle with any non-first preceding object.

(8) The crash-safe vehicle control system according to the above-described form (7), wherein the object-information obtaining device obtains, as the object information on the at least one non-first preceding object, the information on a second preceding vehicle existing immediately in front of the first preceding vehicle, and the crash-safe control devices is operable to estimate a possibility of crashing between the first and second preceding vehicles, and control the operating device on the basis of the estimated possibility of crashing between the first and second preceding vehicles.

The crash-safe vehicle control system according to the above-described form (8) of the invention is arranged to effect the crash-safe control of the operating device, on the basis of a possibility of a multiplex crashing involving a plurality of vehicles including the own vehicle, and a plurality of preceding vehicles which include the first preceding vehicle and the non-first preceding object in the form of the second preceding vehicle.

(9) The crash-safe vehicle control system according to the above-described form (7) or (8), wherein the crash-safe control device is operable to control a moment of initiation of an operation of the operating device such that the moment of initiation when the possibility of crashing between the first vehicle and the at least one non-first preceding object is relatively high is advanced with respect to that when the possibility is relatively low.

The above-described form (9) of the present invention is one embodiment of the crash-safe control of the operating device on the basis of a possibility of crashing between the first preceding vehicle and any non-first preceding object(s). An operational delay of the operating device can be reduced by advancing the moment of initiation of the operation of the operating device. The moment of initiation of the operation of the operating device can be advanced by changing the predetermined conditions for initiating the ACC and PCS controls, for example. Where a determination as to whether the initiating conditions are satisfied or not is made on the basis of the relationship parameters of the own vehicle and the first preceding vehicle, for example, the moment of initiation of the operation of the operating device can be advanced by changing the threshold values of the relationship parameters such that the operation is initiated even when the possibility of crashing between the own vehicle and the first preceding vehicle as represented by the relationship parameters is relatively low. For advancing the moment of initiation of the ACC control of the own vehicle, it is possible to advance the moment of initiation of an operation of a device operable to decelerate the own vehicle, depending upon the estimated possibility of crashing, more specifically, to advance the moment of initiation of reduction of an output of an engine device, the moment of initiation of a shift-down action of a transmission device, and the moment of activation of a hydraulic brake device. For advancing the moment of initiation of the PCS control, it is possible to advance the moment of activation of pre-tensioners of a seatbelt device to pre-tension seatbelts prior to an occurrence of the crashing of the own vehicle, and the moment of application of an emergency brake to the own vehicle. The moment of initiation of the operation of the operating device may be continuously advanced with an increase in the estimated possibility of crashing, or in steps depending upon a specific one of a plurality of control modes which is selected on the basis of the estimated possibility of crashing.

(10) The crash-safe vehicle control system according to any one of the above-described forms (7)-(9), wherein the crash-safe control device is operable to control the operating device such that an effect to be achieved by the operation of the operating device when the possibility of crashing between the first vehicle and the at least one non-first preceding object is relatively high is increased with respect to that when the possibility is relatively low.

The above-described form (10) of the present invention is another embodiment of the crash-safe control of the operating device on the basis of a possibility of crashing between the first preceding vehicle and any non-first preceding object(s). An increase of the effect to be achieved by the operation of the operating device assures an increased degree of stability in the function to be performed by the operating device. The effect to be achieved by the operation of the operating device can be generally increased by increasing an amount of operation of the operating device, or a force generated by the operating device. For example, the effect to be achieved by the ACC or PCS control operation can be increased by increasing a deceleration value of the own vehicle or an effect to be achieved by the occupant protective device. Described in detail, the effect to be achieved by the ACC control operation when the possibility of crashing is relatively high can be increased by controlling a vehicle decelerating device so as to increase the deceleration value of the own vehicle, or by controlling a hydraulic brake device so as to raise fluid pressure in hydraulically operated wheel brake cylinders of the brake device. The effect to be achieved by the PCS control operation when the possibility of crashing is relatively high can be increased by controlling the pre-tensioners of a seatbelt device so as to increase the pre-tension of the seatbelts prior to the crashing. The effect to be achieved by the operation of the operating device may be continuously increased with an increase in the estimated possibility of crashing, or in steps depending upon a specific one of a plurality of control modes which is selected on the basis of the estimated possibility of crashing.

(11) The crash-safe vehicle control system according to any one of the above-described forms (2)-(10), wherein the object-information obtaining device obtains, as the object information on the at least one non-first preceding object, the information on a second preceding vehicle existing immediately in front of the first preceding vehicle, and the crash-safe control devices is operable to estimate a deceleration value of the second preceding vehicle on the basis of the obtained information on the second preceding vehicle, and control the operating device on the basis of the estimated deceleration value of the second preceding vehicle.

Where the non-first preceding object is the second preceding vehicle running immediately in front of the first preceding vehicle, there is a high possibility that an abrupt brake is applied to the first preceding vehicle, in response to an abrupt brake application to the second preceding vehicle. Further, the first preceding vehicle may collide with the second preceding vehicle, in spite of a brake application to the first preceding vehicle. In such events, there is a high possibility of crashing of the own vehicle with the first preceding vehicle. In the crash-safe vehicle control system according to the above-described form (11) of this invention, the crash-safe control device may be arranged to determine that the own vehicle has a high possibility of crashing with the first preceding vehicle, when the detected deceleration value of the second preceding vehicle exceeds a threshold value, and activates the suitable crash-safe control of the operating device. Where the relative speed between the own vehicle and the second preceding vehicle can be detected, the deceleration value of the second preceding vehicle can be obtained by calculating the running speed of the second preceding vehicle on the basis of the detected relative speed between the own and second preceding vehicles, and obtaining the deceleration value of the second preceding vehicle on the basis of a rate of change of the calculated running speed. Alternatively, the deceleration value of the second preceding vehicle can be obtained by obtaining a relative deceleration value of the own and second preceding vehicles on the basis of a rate of change of the detected relative speed. The present crash-safe vehicle control system may be considered to be a system arranged to control the operating device on the basis of a possibility of crashing between the first and second preceding vehicles which is estimated on the basis of the deceleration value of the second preceding vehicle. In this respect, the present system may be considered to be one embodiment of the system arranged to control the operating device on the basis of an estimated possibility of crashing between the first preceding vehicle and the non-first preceding object.

(12) The crash-safe vehicle control system according to the above-described form (11), wherein the crash-safe control device is operable to control a moment of initiation of an operation of the operating device such that the moment of initiation when the estimated deceleration value of the second preceding vehicle is relatively high is advanced with respect to that when the estimated deceleration value is relatively low.

The crash-safe vehicle control system according to the above-described form (12) of this invention is one embodiment of the system according to the above-described form (11) wherein the operating device is controlled on the basis of the estimated deceleration value of the second preceding vehicle. The operational delay of the operating device can be reduced by advancing the moment of initiation of the operation of the operating device. The specific arrangement for advancing the moment of initiation of the operation of the operating device have been described above with respect to the form (9) of this invention.

(13) The crash-safe vehicle control system according to the above-described form (11) or (12), wherein the crash-safe control device is operable to control the operating device such that an effect to be achieved by the operation of the operating device when the estimated deceleration value of the second preceding vehicle is relatively high is increased with respect to that when the estimated deceleration value is relatively low.

The crash-safe vehicle control system according to the above-described form (13) of this invention is another embodiment of the system according to the above-described form (11) wherein the operating device is controlled on the basis of the estimated deceleration value of the second preceding vehicle. An increase of the effect to be achieved by the operation of the operating device assures increased degree of stability in the function to be performed by the operating device. The specific arrangements for increasing the effect to be achieved by the operation of the operating device have been described above with respect to the form (10) of this invention.

(14) The crash-safe vehicle control system according to any one of the above-described forms (2)-(13), wherein the object-information obtaining device obtains the information on the first preceding vehicle, as the object information on one of said at least one preceding object, and the crash-safe control device is operable to estimate at least one relationship value indicative of a relationship between the first preceding vehicle and the above-indicted at least one non-first preceding object, on the basis of the information on the first preceding vehicle and the above-indicated non-first-preceding-object information on the at least one non-first preceding object, which have been obtained by the object-information obtaining device, said at least one relationship value being selected from a distance between the first preceding vehicle and one of the at least one non-first preceding object, a time up to a moment of arrival of the first preceding vehicle at a present position of the above-indicated one non-first preceding object, and a time up to a moment of crashing of the fist preceding vehicle with the above-indicated one non-first preceding object, the crash-safe control device controlling the operating device on the basis of the estimated at last one relationship value.

In the crash-safe vehicle control system according to the above-described form (14) of this invention, the operating device is controlled on the basis of the relationship between the first preceding vehicle and the above-indicated at least one non-first preceding object, which is represented by at least one of the relationship values or parameters indicated above. These relationship parameters are suitable for estimating a possibility of crashing between the first preceding vehicle and any non-first preceding object. In this respect, the present crash-safe vehicle control system may be one embodiment of the above-described system wherein the operating device is controlled on the basis of an estimated possibility of crashing between the first preceding vehicle and the non-first preceding object. It will be understood that the possibility of crashing between the first preceding vehicle and the non-first preceding object increases with a decrease in the values of the above-indicated relationship parameters (i.e., distance between the first preceding vehicle and the non-first preceding object, time up to the moment of arrival of the first preceding vehicle at the present position of the non-first preceding object, and time up to the moment of crashing of the first preceding vehicle with the non-first preceding object), and therefore the possibility of crashing between the own vehicle and the first preceding vehicle increases with the decrease in the values of the relationship parameters.

(15) The crash-safe vehicle control system according to the above-described form (14), wherein the object-information obtaining device obtains the information on a second preceding vehicle existing immediately in front of the first preceding vehicle, as the object information on the above-indicated one non-first preceding object, and the crash-safe control device is operable to estimate, as the at least one relationship value, at least one of the distance between the first and second preceding vehicles, the time up to the moment of arrival of the first preceding vehicle with the second preceding vehicle, and the time up to the moment of crashing of the first preceding vehicle with the second preceding vehicle, on the basis of the information on the first preceding vehicle and the information on the second preceding vehicle, which have been obtained by the object-information obtaining device, the crash-safe control device controlling the operating device on the basis of the estimated at least one of said distance and times.

The crash-safe vehicle control system according to the above-described form (15) of the invention is arranged to effect the crash-safe control of the operating device, in view of the relationship between the first preceding vehicle and the non-preceding object in the form of the second preceding vehicle, and a possibility of a multiplex crashing involving a plurality of vehicles including the own vehicle, and a plurality of preceding vehicles which include the first and second preceding vehicles.

(16) The crash-safe vehicle control system according to the above-described form (14) or (15), wherein the crash-safe control device is operable to control a moment of initiation of an operation of the operating device such that the moment of initiation when the estimated at least one relationship value is relatively small is advanced with respect to that when the estimated at least one relationship value relatively large.

The crash-safe vehicle control system according to the above-described form (16) of this invention is one embodiment of the system wherein the operating device is controlled on the basis of the at least one relationship value described above with respect to the above-described form (14). An operational delay of the operating device can be reduced by advancing the moment of initiation of the operation of the operating device. The specific arrangement for advancing the moment of initiation of the operation of the operating device have been described above with respect to the form (9) of this invention.

(17) The crash-safe vehicle control system according to any one of the above-described forms (14)-(16), wherein the crash-safe control device is operable to control the operating device such that an effect to be achieved by the operation of the operating device when the estimated at least one relationship value is relatively small is increased with respect to that when the estimated at least one relationship value is relatively large.

The crash-safe vehicle control system according to the above-described form (17) of this invention is another embodiment of the system according to the above-described form (14) wherein the operating device is controlled on the basis of the at least one relationship value. An increase of the effect to be achieved by the operation of the operating device assures increased degree of stability in the function to be performed by the operating device. The specific arrangements for increasing the effect to be achieved by the operation of the operating device have been described above with respect to the form (10) of this invention.

(18) The crash-safe vehicle control system according to any one of the above-described forms (2)-(17), wherein the object-information obtaining device includes an operating-state-information obtaining device arranged to obtain operating-state information indicative of an operating state of a preceding vehicle which is one of the at least one preceding object, and the crash-safe control device is operable to control the operating device on the basis of the operating-state information obtained by the operating-state-information obtaining device.

When the first preceding vehicle is braked, or when a distance of the first preceding vehicle to the second preceding vehicle or any other non-first preceding vehicle becomes relatively short, for example, a hazard lamp provided on the first preceding vehicle may be turned on to inform the own vehicle of a decelerating state of the first preceding vehicle. In this case, it is reasonable to consider that there is a high possibility of crashing of the own vehicle with the first preceding vehicle. Thus, the operating-state information indicative of the illuminated state of the hazard lamp or brake lamp or any other operating state of the preceding vehicle is effective to estimate the possibility of crashing of the own vehicle with the first preceding vehicle. When the preceding vehicle is accelerated with an operation of an accelerator pedal to operate a throttle valve of the engine, it is reasonable to consider that there is a low possibility of crashing of the own vehicle with the first preceding vehicle. The crash-safe vehicle control system according to the above-described form (18) is arranged to effect the crash-safe control of the operating device on the basis of the operating-state information received from the preceding vehicle. Described more specifically, the control mode of the operating device may be changed when an appropriate device on the preceding vehicle is operated. The preceding vehicle may be the first preceding vehicle, or the non-first preceding vehicle, typically the second preceding vehicle. Since the own vehicle has the highest possibility of crashing directly with the first preceding vehicle, it is desirable to obtain at least the operating-state information on the first preceding vehicle. The crash-safe control of the operating device can be effected with increased stability, on the basis of not only the object information obtained by the radar device, but also the operating-state information obtained by the operating-state-information obtaining device.

(19) The crash-safe vehicle control system according to the above-described form (18), wherein the operating-state-information obtaining device includes a preceding-vehicle monitoring camera device operable to monitor the preceding vehicle, and is operable to obtain, as the operation-state information, an operating state of each of at least one of a brake lamp and a hazard lamp provided on the preceding vehicle, on the basis of image data obtained by the preceding-vehicle monitoring camera device, and the crash-safe control device is operable to control the operating device on the basis of the obtained operating state of each of the at least one of the brake lamp and the hazard lamp.

In the above-described form (19) of the present invention, the operating-state-information obtaining device may include both the preceding-vehicle monitoring camera device, and an image processor operable to process the image data obtained by the preceding-vehicle monitoring camera device. Since the operating-state information can be obtained by only the object-information obtaining device which is provided on the own vehicle and which include the operating-state-information obtaining device, the present system is practically effective to effect the crash-safe control of the own vehicle. Where the present system is capable of effecting the width-related-information-dependent control described above, as well as the non-first-preceding-object-information-dependent control, the preceding-vehicle monitoring camera device may also be used for imaging the at least one preceding object, as described below with respect to the following form (23) of the invention.

(20) The crash-safe vehicle control system according to the above-described form (18) or (19), wherein the operating-state-information obtaining device includes a receiver device operable to receive the operating-state information transmitted by radio communication, and the crash-safe control device is operable to control the operating device on the basis of the operating-state information received by the receiver device.

In the crash-safe vehicle control system according to the above-described form (20) of the invention, the operation-state-information obtaining device is arranged to receive the operating-state information by radio communication. The receiver device of the operating-state-information obtaining device may receive the operating-state information directly from the preceding vehicle, by radio communication with the preceding vehicle, or indirectly from communication units existing along a roadway, by radio communication with the communication units. The receiver device permits easy and reliable reception of the operating-state information from the preceding vehicle and accurate control of the operating device, in an infrastructure environment well established for communication between the own vehicle and the other vehicles and between the own vehicle and ground communication facilities.

(21) The crash-safe vehicle control system according to any one of the above-described forms (1)-(20), wherein the crash-safe control device is operable to effect a least the width-related-information-dependent control.

The crash-safe vehicle control system according to the above-described form (21) of the invention is capable of effecting the width-related-information-dependent control described above, and the following forms (22)-(34) of the crash-safe vehicle control system relate to various arrangements for effecting the width-related-information-dependent control.

(22) The crash-safe vehicle control system according to the above-described form (21), wherein the object-information obtaining device includes a width-related-information obtaining device operable to obtain the width-related information relating to the above-indicated at least one specific object.

In the crash-safe vehicle control system according to the above-described form (22) of the present invention, the object-information obtaining device includes a width-related-information obtaining device operable to obtain the width-related information on each specific object. The width-related-information obtaining device is not particularly limited in construction, provided this obtaining device is able to obtain the width-related information. For instance, the width-related-information obtaining device is a radar device operable to detect a position of each specific object relative to the own vehicle, a combination of a camera device and an image-data processing device (which will be described), or any other suitable device.

The crash-safe vehicle control system according to the above-described form (22) is defined in an independent format drafted as follows:

A crash-safe vehicle control system for controlling an own vehicle, comprising:

an object-information obtaining device operable to obtain object information on each of at least one preceding object existing in front of the own vehicle, the object information including information relating to a position of each preceding object relative to the own vehicle;

an operating device operable in the presence of a high possibility of crashing of the own vehicle with one of the at least one preceding object; and a crash-safe control device operable to control the operating device on the basis of the object information on the at least one preceding object obtained by the object-information obtaining device, and wherein the object-information obtaining device includes a with-related-information obtaining device operable to obtain width-related information relating to at least a width and a widthwise position of at least one specific object selected from the above-indicated at least one preceding object, and the crash-safe control device is operable to control the operating device, on the basis of the width-related information of the at least one specific object obtained by the width-related-information obtaining device.

It is to be understood that the crash-safe vehicle control system defined above in the independent format may include features of the following forms (23)-(34) of the crash-safe vehicle control system.

(23) The crash-safe vehicle control system according to the above-described form (22), wherein the width-related-information obtaining device includes an object-imaging camera device operable to take an image of each of the at least one preceding object, and an image-data processing device operable to process image data representative of the image taken by the object-imaging camera device, for obtaining the width-related information on each of the at least one specific object.

The crash-safe vehicle control system according to the above-described form (23) of this invention is arranged to obtain the width-related information from the image data obtained by the object-imaging camera device. As described above, the use of a radar device to accurately obtain the width-related information requires the preceding object to be provided with a reflector at an appropriate portion thereof. On the other hand, the use of the object-imaging camera device and the image-data processing device permit the width-related information to be accurately obtained, without the provision of such a reflector on the preceding object. In this respect, the present crash-safe vehicle control system is practically effective to control the operating device. The camera device includes an imaging device, which is not particularly limited in construction and which may be a CCD camera or a COMS camera. The camera device may be arranged to take a monochrome image or a color image. The image-data processing device may be principally constituted by a computer, and is configured depending upon the specific type of the camera device and the desired manner of data processing. The manner of processing the image data to obtain the width-related information is not particularly limited, and may be a process well known in the field of image data processing. The camera device may include a single camera or a plurality of cameras. For instance, the camera device is a stereo type camera device using two cameras which are spaced apart from each other. The stereo type camera device permits recognition of the position of the preceding object in the longitudinal or running direction of the own vehicle.

(24) The crash-safe vehicle control system according to the above-described form (22) or (23), wherein the object-information obtaining device includes an object detecting radar device operable to detect the above-described at least one preceding object, in addition to the width-related-information obtaining device.

In the crash-safe vehicle control system according to the above-described form (24) of the invention, the object-information obtaining device includes both the width-related-information obtaining device and the object detecting radar device. Where all of the preceding objects are detected by the object-imaging camera device and the image-data processing device, the image-data processing device requires a relatively long time for processing the image data, and a load acting on the image-data processing device is considerably large when the number of the preceding objects is relatively large. On the other hand, the detection of the preceding objects by the radar device is comparatively easy. In the present crash-safe vehicle control system, the object information on each preceding object can be efficiently obtained by the radar device, so that the width-related information on a selected one or ones of the preceding objects, that is, width-related information on each specific object is obtained by the object-imaging camera device and the image-data processing device. The radar device is not particularly limited in construction, but is desirably arranged to obtain, as the object information, at least one of a distance, a relative angle and a relative speed between each of the at least one preceding object and the own vehicle. The radar device arranged to generate a millimeter wave as a detecting wave is desirable, since this type of radar device is capable of detecting all of the distance, relative angle and relative speed indicated above. The millimeter wave generated by the radar device of millimeter wave type has a comparatively long wavelength. Unlike a radar device utilizing a laser, the millimeter wave type radar device is able to detect a non-first preceding object at least partly hidden by the first preceding vehicle, by utilizing a diffraction phenomenon or reflection of the millimeter wave by a roadway surface.

Accordingly, the millimeter wave type radar device is capable of obtaining information on the non-first preceding object, such as a distance, relative angle and relative speed between the non-first preceding object and the first preceding vehicle. The width-related-information obtaining device including the object-imaging camera device and the image-data processing device is not capable of obtaining the width-related information on a non-first preceding object hidden by the first preceding vehicle. In this respect, the millimeter wave type radar device functions to supplement the width-related-information obtaining device. As discussed below in detail, the radar device is preferably an FM-CW radar device capable of a scanning operation by a digital-beam forming (DBF) technique, for detecting the preceding object. Where the crash-safe vehicle control system according to the present form (24) is operable to effect the non-first-preceding-object-information-dependent control as well as the width-related-information-dependent control, a single radar device may commonly function as the object-information obtaining radar device described with respect to the above-described form (3) and the object detecting radar device described with respect to the present form (24).

(25) The crash-safe vehicle control system according to the above-described form (24), wherein the object detecting radar device is operable to obtain information relating to an approximate position of each of the at least one preceding object, and the width-related-information obtaining device is operable to obtain the width-related information on each of the at least one specific object, on the basis of the information relating to approximate position obtained by the object detecting radar device.

The crash-safe vehicle control system according to the above-described form (25) of the invention is one embodiment of the system wherein the object-information obtaining device includes the object detecting radar device. As discussed below in detail, a radar device in general is not able to accurately detect the position of a preceding object under some situation, but is able to efficiently detect an approximate position of this preceding object. In the present crash-safe vehicle control system, the width-related-information obtaining device obtains the width-related information on each specific object on the basis of its approximate position obtained by the radar device, so that the load acting on the width-related-information obtaining device can be reduced. Where the width-related-information obtaining device includes an object-imaging camera device and an image-data processing device operable to obtain the width-related information, an image of the preceding object in question is extracted within a field of view of the camera device, as an image of a specific object, on the basis of the approximate position of the preceding object detected by the radar device, and the image data representative of this image are processed to obtain the width and/or widthwise position of the specific object.

(26) The crash-safe vehicle control system according to the above-described form (24) or (25), wherein the width-related-information obtaining device selects the above-indicated at least one specific object from the above-indicated at least one preceding object detected by the object detecting radar device, and obtains the width-related information on each of the at least one specific object.

The crash-safe vehicle control system according to the above-described form (26) of this invention is one embodiment of the system wherein the object-information obtaining device includes the object detecting radar device. Where each preceding object is detected by the object-imaging camera device and the image-data processing device, the image-data processing device requires a relatively long time for processing the image data, and a load acting on the image-data processing device is considerably large, as described above. In the present crash-safe vehicle control system, a selected one or ones of the preceding objects detected by the radar device is/are selected as the at least one specific objects, and the width-related information is obtained for only the selected at least one specific object. Accordingly, the object information for all of the preceding objects can be efficiently obtained, and the width-related information on the specific object or objects can also be efficiently obtained. For instance, the width-related information is obtained for only those of the preceding objects which have been detected by the radar device and the width-related information of which is necessary for the crash-safe control of the operating device. Alternatively, the width-related information is obtained for only the preceding objects which are found to lie on a running lane of the own vehicle.

(27) The crash-safe vehicle control system according to any one of the above-described forms (21)-(26), wherein the crash-safe control device is operable to control the operating device on the basis of the widthwise center position of the at least one specific object represented by the width-related information.

The crash-safe vehicle control system according to the above-described form (27) of the present invention is one embodiment relating to a reference position of each preceding object which is used for the crash-safe control of the operating device. In the present system wherein the center position of each preceding object in its direction of width is selected as its reference position, the manner of the crash-safe control can be relatively easily determined.

(28) The crash-safe vehicle control system according to any one of the above-described forms (21)-(27), wherein the crash-safe control device is operable to control the operating device, on the basis of at least one of widthwise opposite positions of each of the at least one specific object which are represented by the width-related information.

The crash-safe vehicle control system according to the above-described form (28) of the present invention is another embodiment relating to the reference position of each preceding object which is used for the crash-safe control of the operating device. In the present system wherein one or both of the widthwise end positions of each preceding object in its direction of width is/are selected as its reference position or positions, the crash-safe control device can easily perform various processing operations, such as an operation to determine whether each preceding object lies on the running lane of the own vehicle.

(29) The crash-safe vehicle control system according to any one of the above-described forms (21)-(28), wherein the crash-safe control device is operable to estimate, on the basis of the width-related information the at least one specific object, a lap ratio of the own vehicle and each of the at least one specific object, the lap ratio being a ratio of an overlapping width of the own vehicle with respect to its overall width, which is expected if the own vehicle collides with each specific object over the overlapping width, the crash-safe control device being operable to control the operating device on the basis of the estimated lap ratio.

When the own vehicle collides or crashes with a preceding object, the own vehicle receives a relatively large impact when the surface area of contact between the own vehicle and the preceding object is relatively large. Where the own vehicle and the preceding object have the same width, the impact is generally considered to be the largest when the own vehicle and the preceding vehicle collide with each other such that the widthwise centerlines of the two vehicle are aligned with each other, namely, when the lap ratio is 1.0 (when the lap percentage is 100%). When the collision is an offset crashing with the centerlines being spaced apart from each other in the direction of width, it is considered that the impact is smaller, and decreases with an increase in the spacing distance between the centerlines of the two vehicles. Thus, the lap ratio is a parameter representative of the magnitude of the crashing impact. The crash-safe control, in particular, the PCS control of the operating device can be optimized to meet the specific situation, when the estimated crashing impact is taken into account for the crash-safe control. Accordingly, the present crash-safe vehicle control system arranged to effect the crash-safe control on the basis of the lap ratio is practically effective to control the operating device.

(30) The crash-safe vehicle control system according to the above-described form (29), wherein the crash-safe control device is operable to control a moment of initiation of an operation of the operating device such that the moment of initiation when the estimated lap ratio is relatively high is advanced with respect to that when the possibility is relatively low.

The above-described form (30) of the present invention is one embodiment of the crash-safe control of the operating device on the basis of the lap ratio of the own vehicle and the preceding object. The crashing impact is considered to be relatively large when the lap ratio is relatively high. In the present crash-safe vehicle control system wherein the moment of initiation of the operation of the operating device is advanced when the lap ratio is relatively high, an operational delay of the operating device can be reduced. The moment of initiation of the operation of the operating device can be advanced by changing the predetermined conditions for initiating the ACC and PCS controls, for example. Where a determination as to whether the initiating conditions are satisfied or not is made on the basis of the relationship parameters of the own vehicle and the first preceding vehicle, for example, the moment of initiation of the operation of the operating device can be advanced by changing the threshold values of the relationship parameters such that the operation is initiated even when the possibility of crashing between the own vehicle and the first preceding vehicle as represented by the relationship parameters is relatively low. For advancing the moment of initiation of the ACC control of the own vehicle, it is possible to advance the moment of initiation of an operation of a device operable to decelerate the own vehicle, depending upon the estimated lap ratio, more specifically, to advance the moment of initiation of reduction of an output of an engine device, the moment of initiation of a shift-down action of a transmission device, and the moment of activation of a hydraulic brake device. For advancing the moment of initiation of the PCS control it is possible to advance the moment of activation of pre-tensioners of a seatbelt device to pre-tension seatbelts prior to an occurrence of the crashing of the own vehicle, and the moment of application of an emergency brake to the own vehicle. The moment of initiation of the operation of the operating device may be continuously advanced with an increase in the estimated lap ratio, or in steps depending upon a specific one of a plurality of control modes which is selected on the basis of the estimated lap ratio.

(31) The crash-safe vehicle control system according to the above-described form (29) or (30), wherein the crash-safe control device is operable to control the operating device such that an effect to be achieved by the operation of the operating device when the estimated lap ratio is relatively high is increased with respect to that when the estimated lap ratio is relatively low.

The above-described form (31) of the present invention is another embodiment of the crash-safe control of the operating device on the basis of the estimated lap ratio. Since the crashing impact is considered to be relatively large when the lap ratio is relatively high, an increase of the effect to be achieved by the operation of the operating device in the present crash-safe vehicle control system assures an increased degree of stability in the function to be performed by the operating device. The effect to be achieved by the operation of the operating device can be generally increased by increasing an amount of operation of the operating device, or a force generated by the operating device. For example, the effect to be achieved by the ACC or PCS control operation can be increased by increasing a deceleration value of the own vehicle or an effect to be achieved by the occupant protective device. Described in detail, the effect to be achieved by the ACC control operation when the estimated lap ratio is relatively high can be increased by controlling a vehicle decelerating device so as to increase the deceleration value of the own vehicle, or by controlling a hydraulic brake device so as to raise fluid pressure in hydraulically operated wheel brake cylinders of the brake device. The effect to be achieved by the PCS control operation when the estimated lap ratio is relatively high can be increased by controlling the pre-tensioners of a seatbelt device so as to increase the pre-tension of the seatbelts prior to the crashing. The effect to be achieved by the operation of the operating device may be continuously increased with an increase in the estimated lap ratio, or in steps depending upon a specific one of a plurality of control modes which is selected on the basis of the estimated lap ratio.

(32) The crash-safe vehicle control system according to any one of the above-described forms (21)-(31), wherein the crash-safe control device is operable to determine, on the basis of the width-related information on the above-indicated at least one specific object, whether each of the at least one specific object lies on an own lane on which the own vehicle is to run, and control the operating device on the basis of a result of said determination.

In the crash-safe vehicle control system according to the above-described form (32) of the invention, each specific object is checked as to whether it is an own-lane object lying on the own lane of the own vehicle. The own lane is an imaginary running lane in which the own vehicle is expected to run and which has a predetermined width and is not necessarily an actual running lane marked on a roadway surface. The width-related information can be effectively used to make the determination as to whether each specific object is the own-lane object. In the present system, the width-related information is used for efficient detection of the preceding objects lying on the own lane.

(33) The crash-safe vehicle control system according to the above-described form (32), wherein the crash-safe control device is operable to determine that each of the at least one specific object lies on the own lane, when each specific object is at least partly located within a width of the own lane.

The crash-safe vehicle control system according to the above-described form (33) of this invention is one embodiment of the system relating to the determination as to whether each specific object is an own-lane object which lies on the own lane. For instance, the preceding object is determined to lie on the own lane, if at least one of the widthwise opposite end positions of the preceding object represented by the width-related information is located within the width of the own lane. In the present system, the determination as to whether each preceding object is an own-lane object can be easily made.

(34) The crash-safe vehicle control system according to any one of the above-described forms (21)-(33), wherein the object-information obtaining device is operable obtain the width-related information on each of at least one specific preceding vehicle each of which is one of the above-indicated at least one specific object and is a preceding vehicle existing in front of the own vehicle, and the crash-safe control device is operable to control the operating device on the basis of the width-related information on each of the at least one specific preceding vehicle.

In the crash-safe control of the operating device, the existence of at least one preceding vehicle in front of the own vehicle is usually taken into account. In the ACC control, for instance, the operating device is controlled to enable the own vehicle to trace or follow the first preceding vehicle. In this case, it is required and significant to obtain the width-related information on the first preceding vehicle. In the PCS control, too, it is required and significant to obtain the width-related information on a preceding vehicle with which the own vehicle has a high possibility of crashing.

(35) The crash-safe vehicle control system according to the above-described form (1), wherein the crash-safe control device is operable to effect both of the non-first-preceding-object-information-dependent control and the width-related-information-dependent control.

The crash-safe vehicle control system according to the above-described form (35) of this invention is arranged to effect both the non-first-preceding-object-information-dependent control and the width-related-information-dependent control is practically effective to control the operating device. The present system may incorporate any one of the technical features according to the above-described forms (3)-(20) and (22)-(34).

BEST MODE FOR CARRYING OUT THE INVENTION

There will be described one embodiment of the present invention in the form of a crash-safe vehicle control system, by reference to the accompanying drawings. It is to be understood that the present invention is not limited to the following embodiment, and may be otherwise embodied with various changes and alterations, such as those described in the foregoing DETAILED DESCRIPTION OF THE INVENTION, which may occur to those skilled in the art.

<Overall Arrangement of the System>

Referring first to the block diagram of FIG. 1, there is shown a crash-safe vehicle control system constructed according to one embodiment of the present invention. As shown in FIG. 1, the present system includes a plurality of electronic control units, each of which is principally constituted by a computer and will be abbreviated as "ECU". These ECUs includes a central ECU serving as a crash-safe control device in the form of a crash-safe ECU 10. As described below in detail, the crash-safe ECU 10 is arranged to obtain a relative positional relationship between an own vehicle and at least one preceding vehicle existing in front of the own vehicle, and effect crash-safe controls of the own vehicle such as ACC and PCS controls (Auto-Cruise Control or Adaptive-Cruise Control, and Pre-Crash-Safety Control) on the basis of the obtained relative positional relationship, by controlling appropriate operating devices which will be described.

The crash-safe ECU 10 is connected to various sensing devices through a sensor-system LAN 12 (a local area network within the own vehicle), and is arranged to control those sensing devices and obtain information relating to the surroundings of the own vehicle, and information relating to the behaviors of the own vehicle. The sensing devices provided in the present crash-safe vehicle control system include a radar device 14, an image-dependent-information obtaining device 20 and a yaw rate sensor 22, which are provided and constructed according to the principle of the present invention. The radar device 14 serves as an object-information obtaining radar device, and an object detecting radar device. The image-dependent-information obtaining device 20 includes two CCD cameras 16 and an image data processor 18. The CCD cameras 16 serve as an object imaging camera device, and a preceding-vehicle monitoring camera device. The yaw rate sensor 22 is arranged to detect a yaw rate of the own vehicle. The radar device 14 and the image-dependent-information obtaining device 20 constitute a major part of an object-information obtaining device of the present crash-safe vehicle control system.

The crash-safe ECU 10 is further connected to a control-system LAN 30 (a local area network within the own vehicle), to which various operating devices are connected through respective ECUs. These operating devices are electronically controlled, and the corresponding ECUs are connected to the crash-safe ECU 10 through the control-system LAN 30. FIG. 1 shows some of the operating devices which are provided and constructed according to the principle of the present invention. These operating devices are: an engine device including an engine ECU 32 and an electronic throttle actuator 34 controlled by the engine ECU 32; a transmission ECU 36 and a transmission actuator 38 controlled by the transmission ECU 36; a brake device including a brake ECU 42 and a brake actuator 44 controlled by the brake ECU 42; a steering device including a steering ECU 46 and a steering actuator 48 controlled by the steering ECU 46; a seatbelt device including a seatbelt ECU 50 and a seatbelt actuator 52 controlled by the seatbelt ECU 50; and an airbag device including an airbag ECU 56 and an airbag actuator 56 controlled by the airbag ECU 54. These operating devices are controlled according to control signals received from the crash-safe ECU 10, as described below in detail. The brake device further includes wheel speed sensors 64, and the steering device further includes a steering angle sensor 66. The crash-safe ECU 10 obtains a running speed and a steering angle of the own vehicle detected by the wheel speed sensors 64 and the steering angle sensor 66, as own-vehicle information relating to the own vehicle. For example, the crash-safe ECU 10 obtains the running speed on the basis of a calculated average of peripheral speeds of four wheels of the own vehicle. The steering angle detected by the steering angle sensor 66 may be obtained by an angle of rotation of a steering wheel of the own vehicle from its neutral position, or a steering angle of steerable wheels of the own vehicle with respect to the longitudinal direction of the own vehicle.

The present crash-safe vehicle control system further includes a communication device 70 for radio communication with the ambient vehicles existing in the neighborhood of the own vehicle, and communication units located along a roadway at predetermined intervals. The communication device 70 is connected to an AV-system LAN 72 (a local area network within the own vehicle), which is provided for car navigation information. The AV-system LAN 72 is connected to the control-system LAN 30 through a gateway ECU 74. Thus, the crash-safe ECU 10 can obtain information relating to the ambient vehicles, and transmit the obtained information to the ambient vehicles. The communication device 70 constitutes a part of the above-described object-information obtaining device.

The present crash-safe vehicle control system is arranged to control the above-described operating devices for effecting the ACC and PCS controls of the own vehicle, so as to prevent a crashing or collision of the own vehicle with preceding objects such as preceding vehicles existing in front of the own vehicle, and so as to protect the occupants (operator or driver and passengers) of the own vehicle upon crashing of the own vehicle, depending upon the conditions of the preceding objects which are detected by the radar device 14, CCD cameras 16, etc.

<Radar Device>

The radar device 14 provided in the present crash-safe vehicle control system is a millimeter wave type radar which uses a millimeter wave as a detecting wave, and is an FM-CW radar device which uses a transmission signal obtained by frequency modulation (FM processing) of a continuous wave (CW). This radar device 14 is installed on the own vehicle, and is operable to detect the preceding objects such as the preceding vehicles and traffic or road signs, and to obtain both of positional relationships and speeds of the own vehicle relative to the preceding objects. The radar device 14 uses an adaptive array antenna filter, and is arranged to form and scan an antenna beam by a digital-beam forming (DBF) technique, for detecting the preceding objects as point information. The detecting principle and DBF technique of the FM-CW radar device are known in the art, as described in detail in JP-A-2003-130945 and JP-A-8-220220, and a further explanation thereof is deemed unnecessary for the understanding of the present invention.

The present radar device 14 detects the preceding objects located within a predetermined detecting range. Described in detail, the radar device 14 is arranged to scan a predetermined angular range (e.g., an angular rage of 10-20°) in front of the own vehicle, within a predetermined distance range defined by a predetermined maximum distance (e.g., 200 m), so that the preceding objects spaced from the own vehicle by more than the maximum distance in the forward direction of the vehicle are not detected by the radar device 14. The radar device 14 is further arranged such that the width of the detecting range in the lateral or width direction of the own vehicle is variable depending upon the steering angle of the own vehicle detected by the steering angle sensor 66 and the running speed of the own vehicle detected by the wheel speed sensors 64 (or the yaw rate of the own vehicle detected by the yaw rate sensor 22), while the own vehicle is running on a curved roadway (in a curved lane of the roadway).

Figure 2:
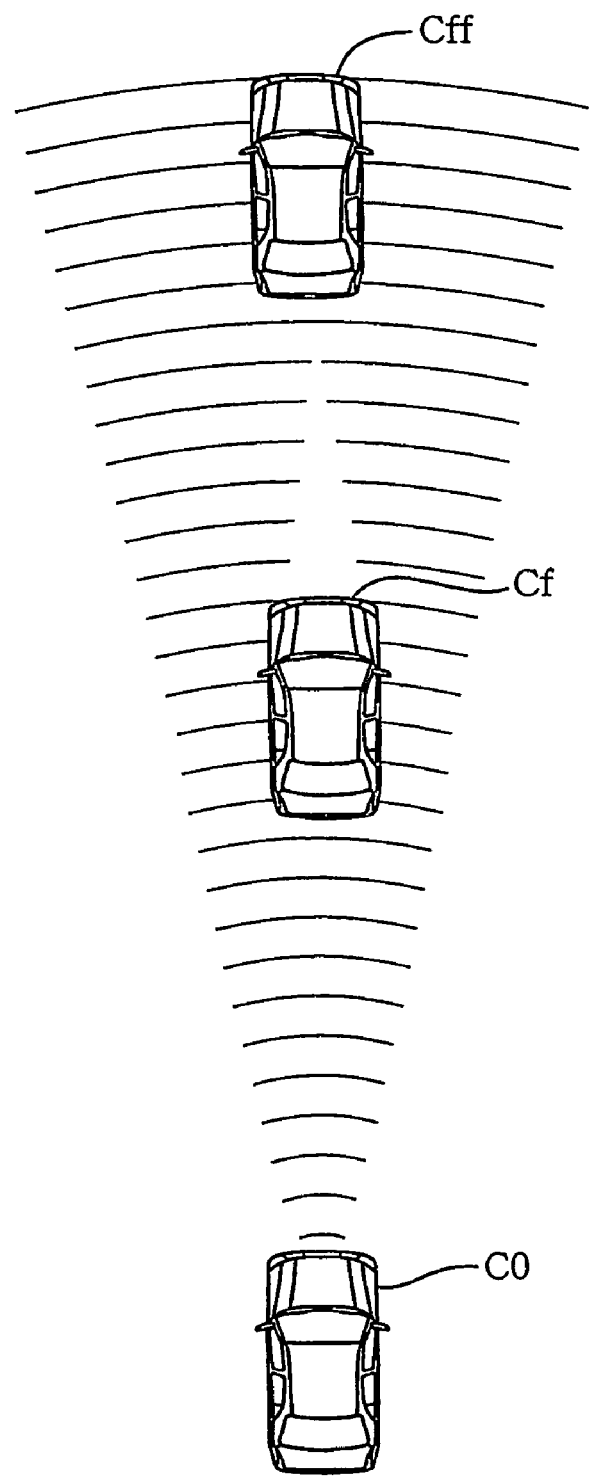
FIG. 2 is a view illustrating a manner in which a second preceding vehicle running in front of a first preceding vehicle which immediately precedes an own vehicle provided with the vehicle control system is detected by diffraction of a wave by a radar device of the vehicle control system according to the embodiment of FIG. 1.
Figure 3:
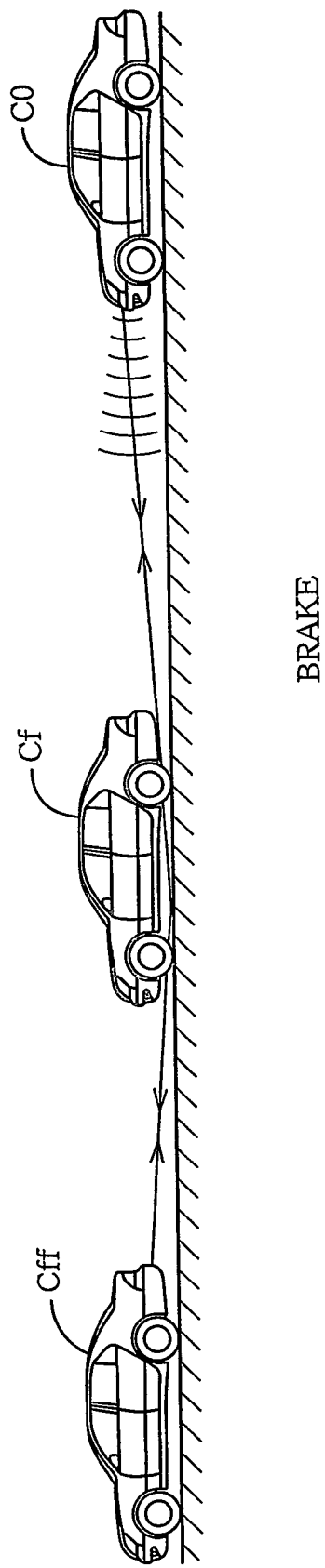
FIG. 3 is a view illustrating a manner in which the second preceding vehicle is detected by reflection of a wave by a roadway surface, by the radar device of the vehicle control system.

Unlike a radar device utilizing a laser, the present radar device 14 is able to detect non-first preceding objects hidden by a first preceding object (e.g., a first preceding vehicle) which immediately precedes the own vehicle. Where there are two preceding vehicles running in front of the own vehicle on a straight roadway, for instance, the radar device 14 is able to detect the second preceding vehicle running in front of the first preceding vehicle immediately preceding the own vehicle. Referring to FIG. 2, there is illustrated an example wherein a wave having a comparatively long wavelength is transmitted from the radar device 14 installed on the own vehicle C0, and the transmitted wave reaches, due to a diffraction phenomenon, the second preceding vehicle Cff located in front of the first preceding vehicle Cf running immediately in front of the own vehicle C0. The wave which has reached the second preceding vehicle Cff is reflected by this vehicle Cff and received by the own vehicle C0. Another example is illustrated in FIG. 3, wherein a detecting wave transmitted from the own vehicle C0 is reflected by a surface area of the roadway located below the body of the first preceding vehicle Cf, and reaches the second preceding vehicle Cff. The detecting wave which has reached the second preceding vehicle Cff is reflected by this vehicle Cff and received by the own vehicle C0. As described below in detail, the present crash-safe vehicle control system including the radar device 14 having technical features as described above obtains the relative positional relationship between the own vehicle and the second preceding vehicle existing in front of the first preceding vehicle immediately preceding the own vehicle, and effectively utilizes the obtained relative positional relationship to effect the ACC and PCS of the own vehicle.

Figure 4:
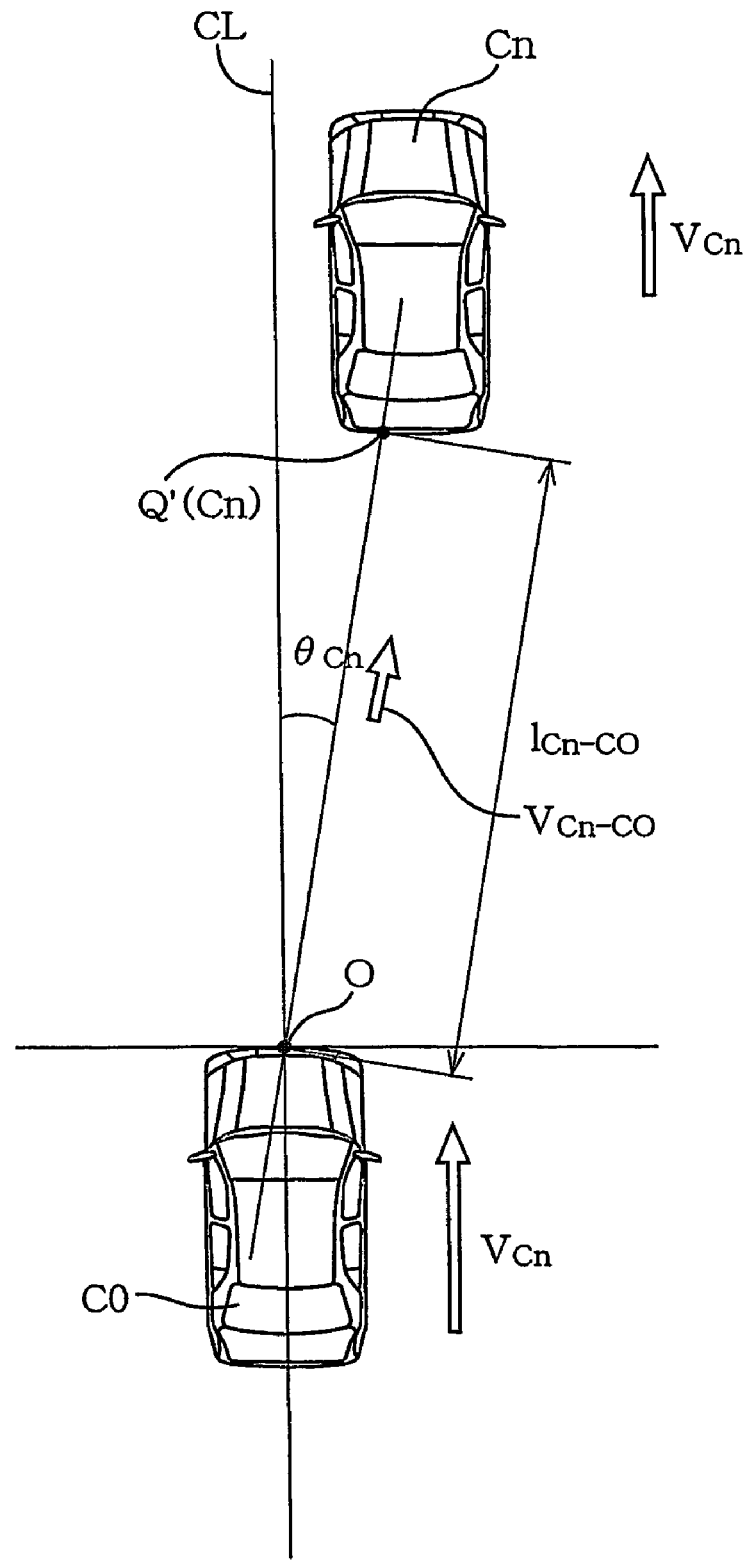
FIG. 4 is a view illustrating a relative position and a relative speed between the own vehicle and a preceding object in the form of a vehicle, which are obtained by the radar device.

The radar device 14 detects a most reflective portion of the preceding object which has the highest reflectivity of the wave received from the radar device 14. Described more specifically with respect to an example of FIG. 4 wherein the preceding object is the preceding vehicle, the rear end face of the preceding vehicle Cn has a most reflective portion Q'(Cn), and the radar device 14 obtains, as the relative positional relationship between the own vehicle C0 and the preceding vehicle Cn, a relative position and a relative speed between a center O of the front end of the own vehicle C0 and the most reflective portion Q'(Cn). Described in greater detail, the radar device 14 obtains (a) a distance $l_{Cn\text{-}C0}$ between the own and preceding vehicles C0 and Cn, (b) a relative angle θCn defined by a widthwise centerline CL of the own vehicle C0 and a straight line O-Q'(Cn) connecting the center O and the most reflective portion Q'(Cn), and (c) a relative speed $V_{Cn\text{-}Cn}$ of the own and preceding vehicles C0, Cn in a direction parallel to the straight line O-Q'(Cn). The distance $l_{Cn\text{-}C0}$ is one of parameters indicative of the relative positional relationship of the own and preceding vehicles C0, Cn. The relative speed is represented by a positive value when the own and preceding vehicles are approaching each other. The relative positional relationship is obtained even where the preceding object is stationary, for example, a stationary vehicle. It is noted that when relative angle $\theta_{Cn}$ is relatively large, the detected relative speed $V_{Cn\text{-}Cn}$ does not accurately represent a difference between the running speeds $V_{C0}$ and $V_{Cn}$ of the own and preceding vehicles, but can be suitably used as a parameter for the ACC and PCS controls, since these controls are effected to deal with a crashing of the own vehicle with the preceding object, on the basis of a rate of change of the distance $l_{Cn\text{-}C0}$.

The position of the most reflective portion of the preceding object in the width direction of the own vehicle is not held constant, but varies depending upon the positional relationship between the own vehicle and the preceding object. Where the widthwise position of the most reflective portion of the preceding object is estimated, the estimated widthwise position may include some amount of error of estimation. Where it is required to accurately control the own vehicle, a suitable measure must be taken to eliminate the error of estimation.

The radar device 14 is arranged to intermittently detect the preceding object, at a very short time interval (e.g., several tens of msecs). The radar device 14 incorporates a processor which is principally constituted by a CPU and arranged to process the obtained object information, to specify the detected preceding object on the basis of a plurality of information sets obtained in the respective last cycles of detection. Described in the other way, the radar device 14 has a function of following or monitoring a specific one or ones of the preceding objects, on the basis of changes of the obtained relative positional relationship, relative speed, etc., so as to eliminate undesirable noises and exclude guardrails and any other things from the objects to be monitored. The manner of this processing, which is not particularly limited, is disclosed in the above-identified publication JP-A-8-220220, for example. The radar device 14 is arranged to effect this processing, so as to select specific objects from among the preceding objects. The specific objects include vehicles preceding the own vehicle, and stationary objects lying on the roadway, such as stationary vehicles. The obtained information on the relative positional relationships and relative speeds of the selected specific objects is transmitted to the image-dependent-information obtaining device 20, and is transmitted to the crash-safe ECU 10 according to a request command received from the ECU 10.

<Image-Dependent-Information Obtaining Device>

The image-dependent-information obtaining device 20 includes the two CCD cameras 16 and the image processor 18 principally constituted by a computer. The two CCD cameras 16 are attached to respective two door mirrors or respective opposite ends of a front grill of the own vehicle, and serve as a stereo camera device. The image-dependent-information obtaining device 20 is operable to detect the position of a preceding object with respect to the reference position (i.e., the center O of the front end face) provided on the own vehicle, according to a so-called principle of triangulation utilizing parallax of each CCD camera 16.

The image processor 18 is arranged to process the relative positional relationship and other information on the specific objects received from the radar device 14. On the basis of the received information, the image processor 18 is able to detect an approximate position of each specific object (as defined by the distance $l_{Cn\text{-}C0}$ and relative angle θCn described above). The thus detected position of the specific object, the image processor 18 recognize, as an image of the specific object, a portion which moves within the field of view of the CCD cameras 16. The manner of processing operation of the image processor 18 is not particularly limited, and is well known in the art.

Figure 5:
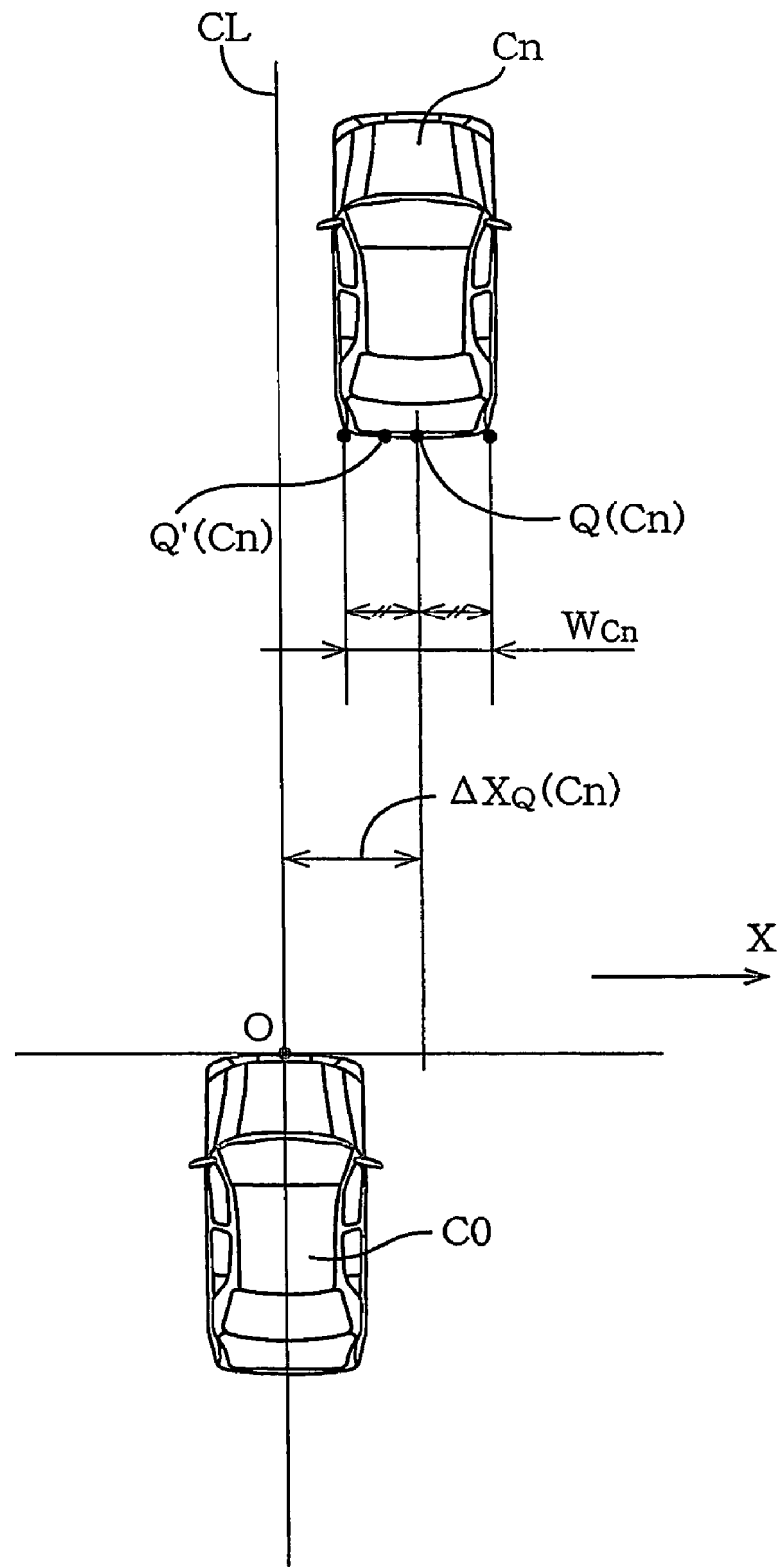
FIG. 5 is a view illustrating width-related information of a preceding object to be obtained by an image-dependent information obtaining device of the vehicle control system of the embodiment.

Referring to FIG. 5, there is illustrated an example wherein the specific object in the form of a preceding vehicle Cn running in front of the own vehicle C0. In this example, the information obtained by the image processor 18 includes a width $W_{Cn}$ of the specific object, and a position $\Delta X_Q(CN)$ of the center Q(Cn) of the specific object in the direction of width of the own vehicle C0, with respect to the widthwise centerline CL of the own vehicle C0. The position $\Delta X_Q(CN)$ is represented by a positive value where the center Q(Cn) is located on the right side of the widthwise centerline CL, and a negative value where the center Q(Cn) is located on the left side of the widthwise centerline CL. These width $W_{Cn}$ and center position $\Delta X_Q(CN)$ of the specific object are obtained by calculation on the basis of the detected opposite ends of the image in the width direction of the own vehicle, which image has been recognized by the image data processor 18 as described above. Where the specific object is the preceding vehicle Cn, for example, two clearance lamps (width end indicator lights) of the preceding vehicle may be detected as the widthwise opposite ends of the preceding vehicle, to obtain the width $W_{Cn}$ and center position $\Delta X_Q(CN)$, which are width-related information which relate to the width and widthwise position of the specific object. Thus, the image-dependent-information obtaining device 20 functions as a width-related-information obtaining device.

As described above, the radar device 14 detects, as the position of the preceding object, the indefinite position of the most reflective portion Q'(Cn) of the preceding object, while on the other hand the image-dependent-information obtaining device 20 is capable of accurately specifying the position of the preceding object. In the present embodiment, the image-dependent-information obtaining device 20 is arranged to accurately detect the width and widthwise position of the preceding object on the basis of the approximate position of the preceding object which has been obtained by the radar device 14. The image data processor 18 provided in the present embodiment is arranged to perform intermittent processing cycles at a vary short time interval (e.g., several tens of msecs), and has a function of following or monitoring the preceding object, like the radar device 14.

The obtained width $W_{Cn}$, center position $\Delta X_Q(CN)$ and other information of each specific object are transmitted to the crash-safe ECU 10 according to a request command received from the ECU 10. It is noted that the CCD cameras 16 may not able to obtain image data of a non-first preceding object hidden by the first preceding object, such as the second preceding vehicle located right in front of the first preceding vehicle which immediately precedes the own vehicle. In this event, the image-dependent-information obtaining device 20 informs the crash-safe ECU 10 of the fact that the CCD camera 16 are not able to obtain the image data.

In the present embodiment, the image-dependent-information obtaining device 20 detects the position of each preceding object, by utilizing the parallax of the two CCD cameras 16. However, this parallax method may be replaced by a method in which the specific object is estimated within the field of view of one of the CCD cameras 16, on the basis of the relative positional relationship obtained by the radar device 14, and the positions of appropriate portions of the estimated specific object within the field of view are detected, to obtain the width-related information on the basis of the detected positions of the appropriate portions of the specific object. According to this alternative method, each of the two spaced-apart CCD cameras 16 can be used alone, so that a dead-angle range (a dead area or space) in which the non-first preceding object is hidden by the first preceding object as viewed by the own vehicle can be narrowed. Accordingly, the image-dependent-information obtaining device 20 may use only one CCD camera 16.

Each of the two CCD cameras 16 of the image-dependent-information obtaining device 20 is a color-imaging camera, so that the image-dependent-information obtaining device 20 is able to recognize the color of the specific object or the color of a portion of the specific object. Where the specific object is a preceding vehicle, for instance, the device 20 is able to recognize illuminated states of a brake lamp, a hazard lamp, directional lamps and any other indicator lamps or lights provided on the preceding vehicle. In the present embodiment, the image data processor 18 is arranged to detect the illuminated state of the brake lamp, as operating-state information of the first preceding vehicle selected as one of the specific objects. The thus obtained operating-state information and the above-indicated width-related information are transmitted to the crash-safe ECU 10. Namely, the image-dependent-information obtaining device 20 also functions as an operating-state-information obtaining device.

<Crash-Safe Controls>

The crash-safe controls performed by the present crash-safe vehicle control system include a non-first-preceding-object-information-dependent control of the operating devices, and a width-related-information-dependent control of the operating devices. These non-first-preceding-object-information-dependent control and width-related-information-dependent control are performed according to a crash-safe control program stored in a ROM of the crash-safe ECU 10. This crash-safe control program is illustrated in the flow chart of FIG. 6, and is initiated with step S0 in which the crash-safe vehicle control system is initialized. Step S0 is sequentially followed by steps S1-S5 to execute respective five routines, that is, step S1 to execute a routine for specifying own-lane objects, step S2 to execute a routine for specifying objects for ACC and PCS operations, step S3 to execute a first routine for control mode determination, step S4 to execute a second routine for control mode determination, and step S5 to execute a routine for effecting the ACC and PCS controls. In the initialization in step S0, various parameters, mode indicator values, flags, etc. are reset. Then, steps S1-S5 are sequentially executed. This crash-safe control program is repeatedly executed with a relatively short cycle time (e.g., several tens of msecs), while an ignition switch of the own vehicle is in its ON state. There will be described the routines in steps S1-S5 in this order.

i) Own-Lane-Object Specifying Routine

Figure 7:
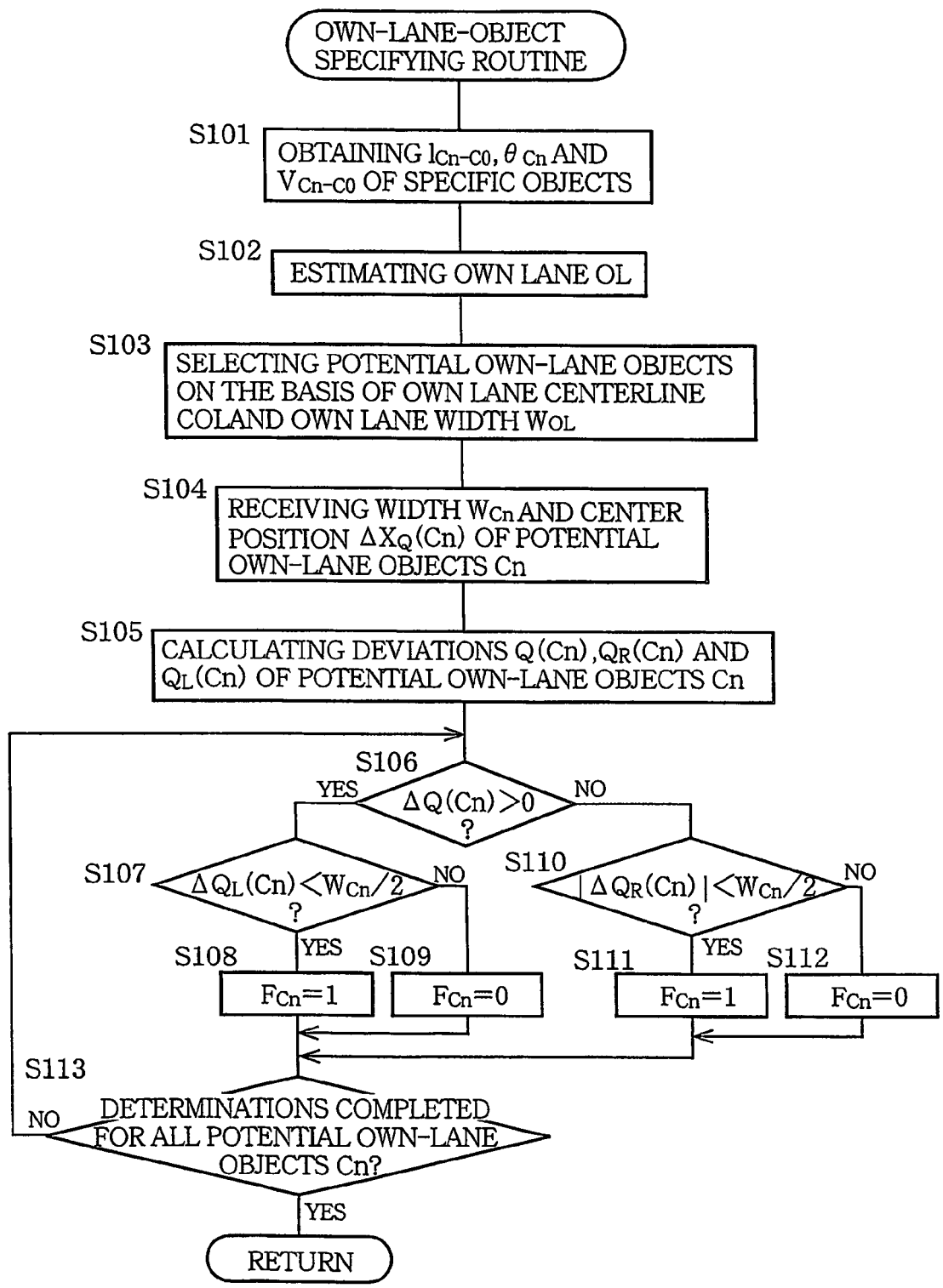
FIG. 7 is a flow chart illustrating an own-lane-object specifying routine executed in step S1 of the crash-safe control program of FIG. 6.

The own-lane-object specifying routine in step S1 is executed as illustrated in the flow chart of FIG. 7. This routine is initiated with step S101 to obtain information on each of the specific preceding objects Cn (n=1, 2, ... ) which have been detected by the radar device 14, as the objects to be monitored. Described in detail, the information obtained in step S101 includes the distance $l_{Cn\text{-}C0}$ between the own vehicle C0 and each preceding object Cn, the relative angle $\theta_{Cn}$ of each preceding object Cn as viewed from the own vehicle C0, and the relative speed $V_{Cn\text{-}Cn}$ of the own object C0 and each specific preceding object Cn. Then, the control flow goes to step S102 to estimate or define an own lane OL on the basis of the steering angle ϕ detected by the steering angle sensor 66 and the running speed $V_{C0}$ of the own vehicle detected by the wheel speed sensors 64 (or the yaw rate γ of the own vehicle detected by the yaw rate sensor 22). The own lane OL is an imaginary running lane in which the own vehicle is expected to run and which has a predetermined width. Described in detail, a centerline COL of the own lane OL is obtained as a path taken by the reference position O of the own vehicle (widthwise center of the front end of the own vehicle), and the own lane OL is defined such that the own lane OL has a predetermined width $W_{OL}$ (e.g., 3 m) a center of which lies on the obtained centerline COL. Where the own vehicle is running straight, the own lane OL is a straight lane extending parallel to the widthwise centerline CL of the own vehicle. Where the own vehicle is turning, the own lane OL is curved according to a radius of turning of the own vehicle.

Figure 8:
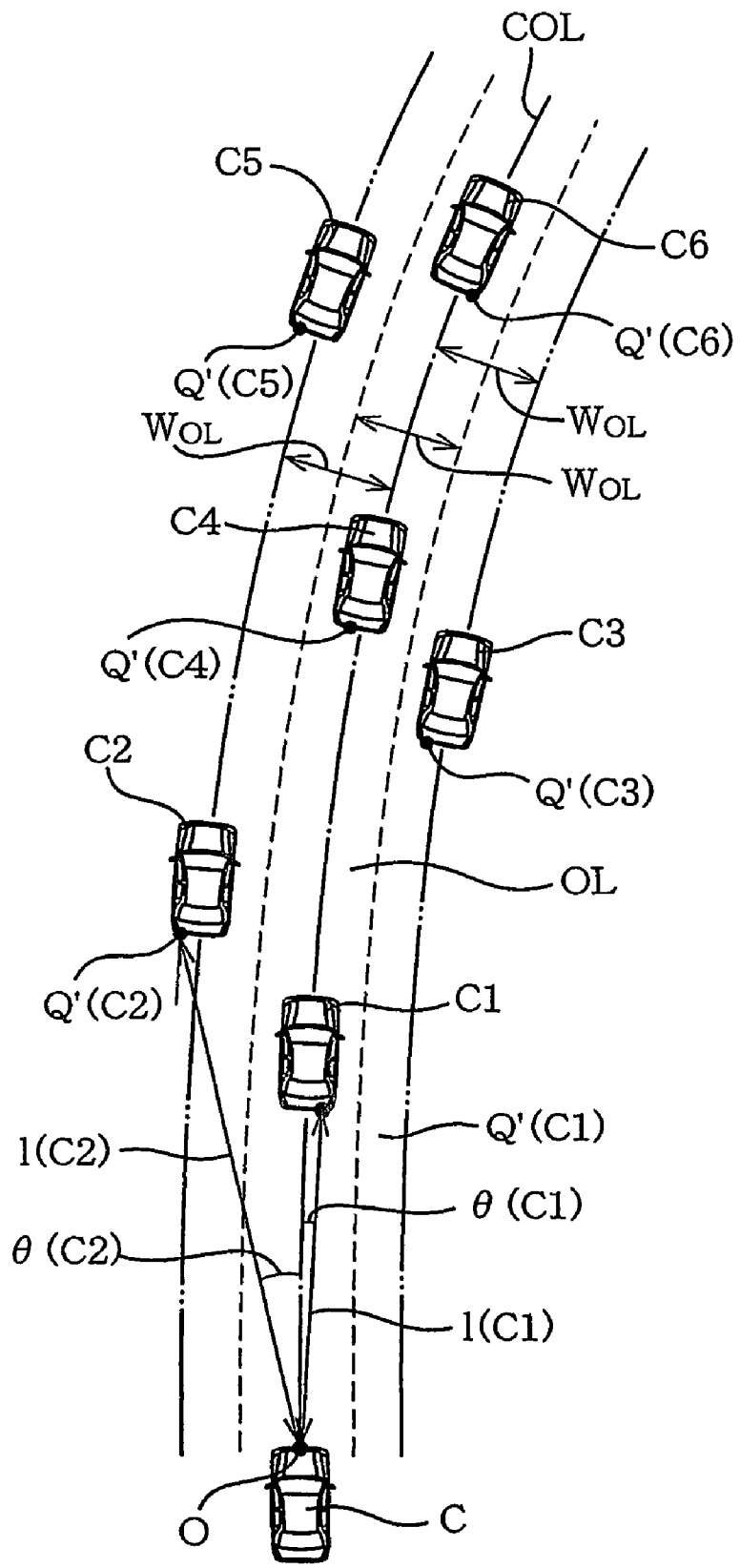
FIG. 8 is a view illustrating relative positions of the own vehicle and specific preceding objects recognized by the radar device.
Figure 9A:
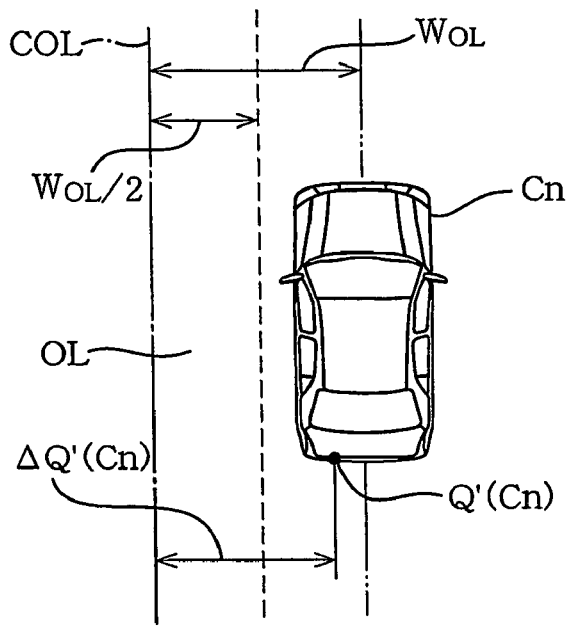
FIGS. 9A and 9B are views for explaining selection of potential own-lane objects.
Figure 9B:
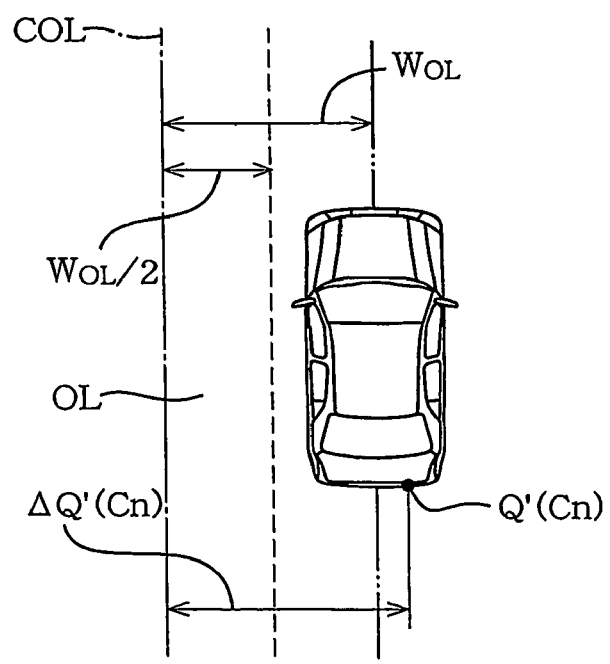

Step S102 is followed by step S103 in which at least one potential own-lane object is selected from the specific objects Cn. Each potential own-lane object is a preceding object Cn having a high probability of existence in the own lane OL. Referring to FIG. 8, there is illustrated a positional relationship of the own vehicle C0 with some specific preceding objects Cn recognized by the radar device 14 while the own vehicle is turning along a curve of the roadway, which has a relatively large radius. In this example of FIG. 8, six preceding vehicles exist as the specific preceding objects Cn in a portion of the roadway in front of the own vehicle C0. FIGS. 9A and 9B show two examples of the positional relationship of one preceding vehicle Cn with the own lane OL. Selection of the potential own-lane objects from the specific objects will be described in detail by reference to FIGS. 8, 9A and 9B. Initially, an amount of deviation $\Delta Q'(Cn)$ of each specific object Cn from the centerline COL of the own lane OL is obtained on the basis of: data indicative of the distance $l_{Cn\text{-}C0}$ between the reference position of the own vehicle C0 and the portion Q'(Cn) of the specific object Cn detected by the radar device 14; data indicative of the relative angle $\theta_{Cn}$; and data indicative of the centerline COL of the own lane OL. That is, the amount of deviation $\Delta Q'(Cn)$ of each specific object Cn from the centerline COL of the own lane OL in the width direction of the own vehicle C0 is calculated. If the absolute value of the calculated amount of deviation $\Delta Q'(Cn)$ is larger than the width $W_{OL}$ of the own lane OL, the preceding object Cn is not selected as a potential own-lane object. Described more specifically, the preceding object Cn in the example of FIG. 9A is selected as the potential own-lane object, but the preceding object Cn in the example of FIG. 9B is not selected as the potential own-lane object. If the width of each preceding object Cn could be accurately detected by the radar device 14, the threshold value used for the selection of the potential own-lane objects would be $W_{OL}/2$. However, the radar device 14 cannot accurately detect the width of the preceding vehicle Cn, the width $W_{OL}$ is used as the threshold value in step S103. Namely, step S103 is formulated to determine whether the portion $Q'(Cn)$ of each specific object Cn recognized by the radar device 14 lies within a lane which has the centerline COL and which has a width $2W_{OL}$. The threshold value used in step S102 is not limited to $W_{OL}/2$, but may be selected as needed depending upon the specific crash-safe controls to be effected. According to the selection in step S103, the preceding vehicles C2 and C5 in the example of FIG. 8 are excluded from the potential own-lane objects.

Figure 10:
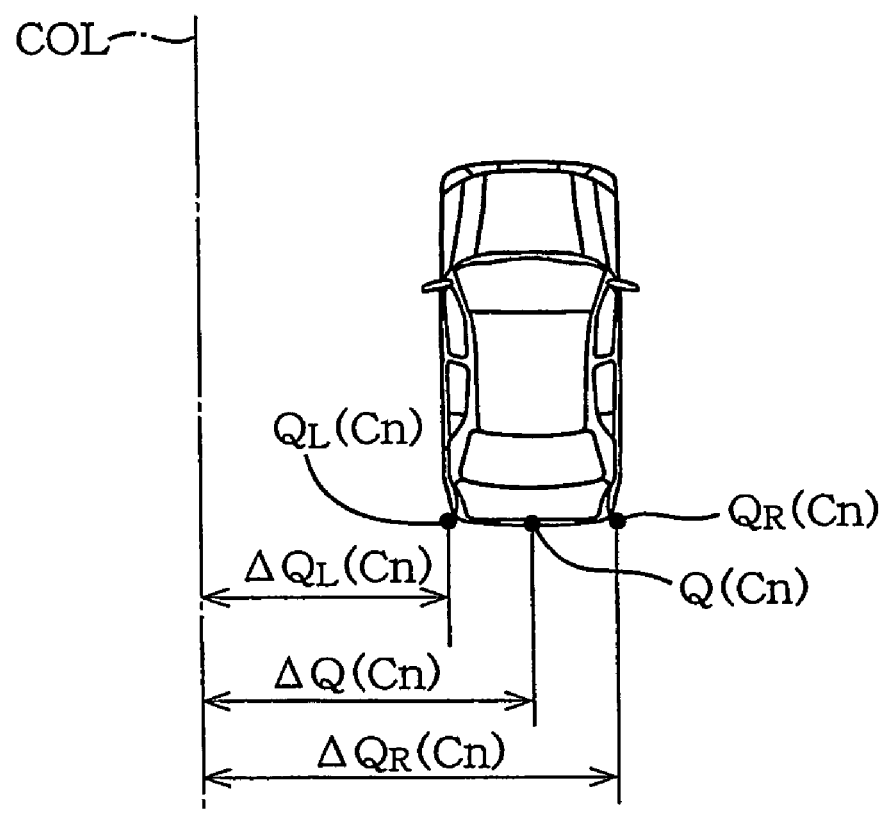
FIG. 10 is a view indicating width-related positions of a specific preceding object, which are calculated on the basis of the width-related information obtained by the image-dependent information obtaining device.

Then, the control flow goes to step S104 to receive the width-related information in the form of the width $W_{Cn}$ of each selected specific object Cn, and the widthwise center position $\Delta X_Q(Cn)$ of the potential own-lane object Cn, from the image-dependent-information obtaining device 20. Step S104 is followed by step S105 to calculate three widthwise positions of each potential own-lane object Cn, as another portion of the width-related information. These three widthwise positions are represented by an amount of deviation $\Delta Q(Cn)$ of the widthwise center $Q(Cn)$ of the specific object Cn from the centerline COL of the own lane OL, and amounts of deviation $\Delta Q_R(Cn)$ and $\Delta Q_L(Cn)$ of the right and left ends $Q_R(Cn)$ and $Q_L(Cn)$ of the potential own-lane object Cn from the centerline COL, as shown in FIG. 10. Each of the amounts of deviation $\Delta Q(Cn)$, $\Delta Q_R(Cn)$ and $\Delta Q_L(Cn)$ is calculated on an assumption that the preceding object Cn is spaced from the own vehicle C0 by the distance $l_{Cn-C0}$ detected by the radar device 14. Each amount of deviation $\Delta Q(Cn)$, $\Delta Q_R(Cn)$, $\Delta Q_L(Cn)$ is a positive value where the corresponding position $Q(Cn)$, $Q_R(Cn)$, $Q_L(Cn)$ is located on the right side of the centerline COL as seen in the running direction of the own vehicle C0, and a negative value where the position $Q(Cn)$, $Q_R(Cn)$, $Q_L(Cn)$ is located on the left side of the centerline COL. Where the own vehicle is running straight (is not turning), the amount of deviation $\Delta Q(Cn)$ of the widthwise center $Q(Cn)$ of the potential own-lane object Cn is equal to the widthwise center position $\Delta X_Q(Cn)$ described above.

Then, the control flow goes to steps S106-S113 to determine whether each potential own-lane object Cn selected in step S103 lies on the own lane OL, that is, whether each potential own-lane object is an own-lane object. Namely, step S106 is implemented to determine whether the amount of deviation $\Delta Q(Cn)$ of the widthwise center $Q(Cn)$ is a positive value, that is, whether the widthwise center $Q(Cn)$ deviates from the centerline COL of the own lane OL in the right direction, as shown in FIGS. 11A and 11B. If an affirmative decision (YES) is obtained in step S106, the control flow goes to sep S107 to determine whether the amount of deviation $\Delta Q_L(Cn)$ of the left end $Q_L(Cn)$ is smaller than a half of the width $W_{OL}$ of the own lane OL, that is, whether the left end $Q_L(Cn)$ lies on the own lane OL, as shown in FIG. 11A. If an affirmative decision (YES) is obtained in step S107, the specific object Cn is considered to exist on the own lane OL, and the control flow goes to step S108 to set an OWN-LANE-OBJECT flag $F_{Cn}$ to "1", that is, to determine the specific object Cn as the own-lane object. If a negative decision (NO) is obtained in step S107, the specific object Cn is considered to exist outside the own lane OL, as shown in FIG. 11B, and the control flow goes to step S109 to reset the OWN-LANE-OBJECT flag $F_{Cn}$ to "0", that is, to determine that the specific object Cn is not the own-lane object. If a negative decision (NO) is obtained in step S106, that is, if the widthwise center $Q(Cn)$ deviates from the centerline COL in the left direction, as shown in FIGS. 11C and 11D, the control flow goes to step S110 to determine whether the absolute value of the amount of deviation $\Delta Q_R(Cn)$ of the right end $Q_R(Cn)$ is smaller than the half of the width $W_{OL}$, that is, whether the right end $Q_R(Cn)$ lies on the own lane OL, as shown in FIG. 11C. If an affirmative decision (YES) is obtained in step S110, the specific object Cn is considered to exist on the own lane OL, and the control flow goes to step S111 to set the OWN-LANE-OBJECT flag $F_{Cn}$ to "1". If a negative decision (NO) is obtained in step S110, the specific object Cn is considered to exist outside the own lane OL, as shown in FIG. 11D, and the control flow goes to step S112 to reset the OWN-LANE-OBJECT flag $F_{Cn}$ to "0". Thus, steps S106-S112 are implemented to determine that the specific object Cn is an own-lane object existing on the own lane OL of the own vehicle C0, when at least the left or right end of the specific object Cn lies within the width $W_{OL}$ of the own lane OL. Steps S108, S109, S111 and S112 are followed by step S113 to determine whether steps S106-S112 have been implemented for all of the potential own-lane objects Cn. Steps S106-S112 are repeatedly implemented until an affirmative decision (YES) is obtained in step S113. One cycle of execution of the routine of FIG. 7 is terminated when the affirmative decision is obtained in step S113. In the example of FIG. 8, the preceding vehicles C1, C4 and C6 are determined to be the own-lane objects As described above, when the image-dependent-information obtaining device 20 has failed to obtain the width-related information on any preceding object Cn hidden by another preceding object $C_{n-1}$ which precedes the object Cn, the crash-safe ECU 10 is informed that the width-related information on this preceding object Cn has not been obtained by the image-dependent-information obtaining device 20. If any one of the potential own-lane objects Cn is any preceding object Cn whose width-related information has not been obtained by the image-dependent-information obtaining device 20, the portion $Q'(Cn)$ of this potential own-lane object Cn recognized by the radar device 14 is regarded as its widthwise center $Q(Cn)$, and the amounts of deviation $\Delta Q_R(Cn)$ and $\Delta Q_L(Cn)$ of the right and left ends of that potential own-lane object Cn are regarded to be zero. That is, the potential own-lane object Cn in question is considered to exist on the own lane OL and is therefore regarded as the own-lane object. If no potential own-lane objects have been selected from the specific objects Cn in step S103, one cycle of execution of the own-lane-object specifying routine is terminated, with steps S106-S113 being skipped.

The determination as to whether each potential own-lane object is an own-lane object is made on the basis of the widthwise center position and at least one of the right and left end positions of the potential own-lane object. Namely, the determination as to whether the potential own-lane object exists on the own lane OL is made on the basis of the width-related information. This determination is more reliable than the determination on the basis of only the information of each specific object obtained by the radar device 14. Where the required accuracy of determination as to whether each specific object is an own-lane object is not so high, steps S104-S113 may be eliminated. In this case, each potential own-lane object selected in steps S101-S103 is determined as an own-lane object.

Steps S101-S103 may be implemented by a data processor of the radar device 14. In this case, the information relating to the potential own-lane objects is transmitted to the image-dependent-information obtaining device 20, and the image data processor 18 processes the received information, to obtain the width-related information of the potential own-lane objects. This modification reduces the number of the objects the information of which is processed by the image data processor 18, so that the load on the image data processor 18 is accordingly reduced.

ii) ACC/PCS Object Specifying Routine

Figure 12:
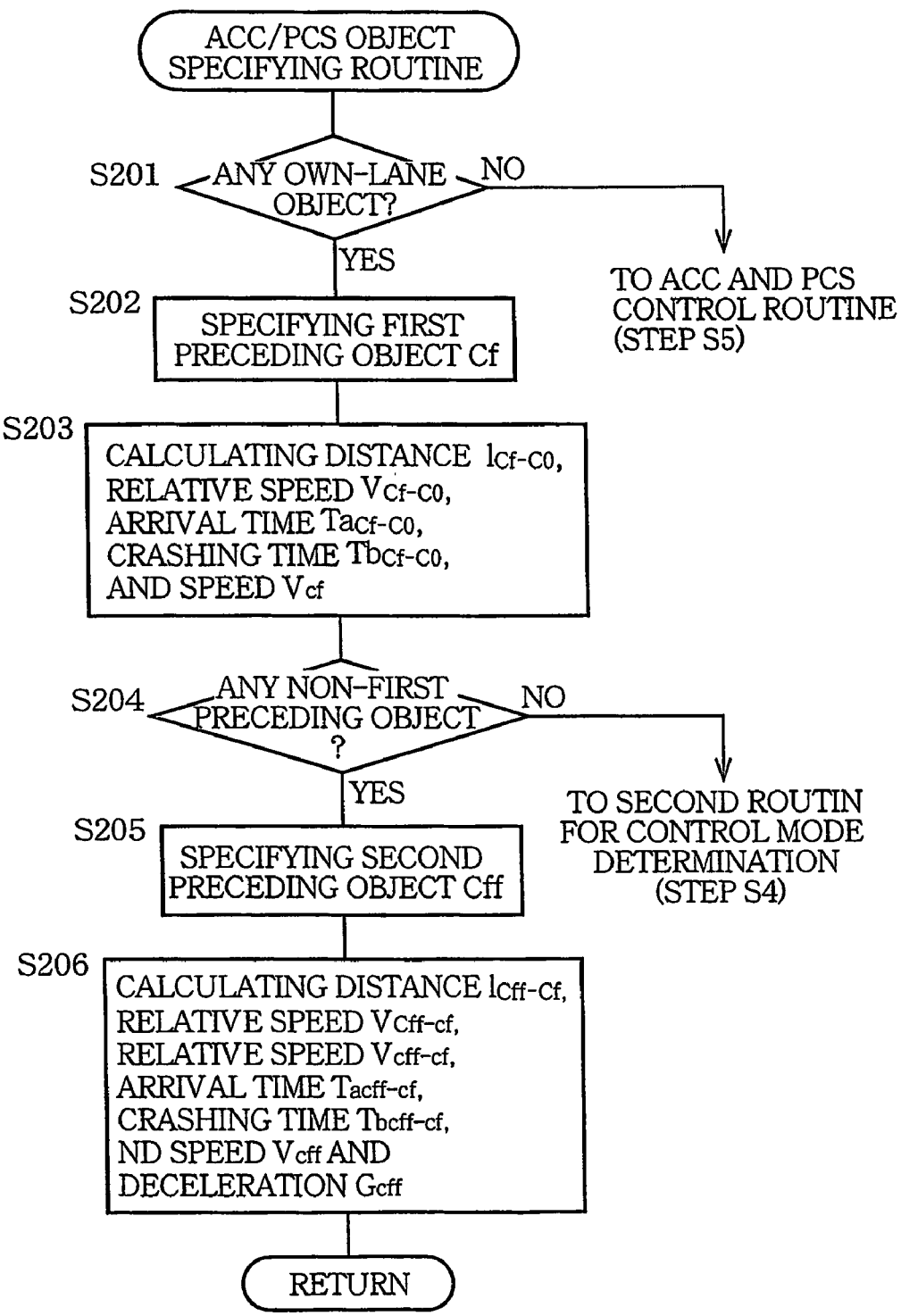
FIG. 12 is a flow chart illustrating a routine for specifying ACC and PCS objects, which is executed in step S2 of the crash-safe control program of FIG. 6.

Step S1 of the crash-safe control program is followed by step S2 to specify the objects for the ACC and PCS controls. That is, after execution of the routine for specifying the own-lane objects, a routine illustrated in the flow chart of FIG. 12 is executed for specifying the objects for the ACC and PCS controls. The routine of FIG. 12 is initiated with step S201 to determine whether there is any own-lane object Cn existing on the own lane OL of the own vehicle C0. If a negative decision (NO) is obtained in step S201, the control flow goes to step S5 of the crash-safe control program of FIG. 6, that is, to the ACC and PCS control routine. If an affirmative decision (YES) is obtained in step S201, the control flow goes to step S202 to specify the first preceding object Cf which immediately precedes the own vehicle C0. Where only one preceding object exists in the own lane OL and in front of the own vehicle, this object is determined as the first preceding object Cf. Where a plurality of preceding objects exist in the own lane OL and in front of the own vehicle, one of the preceding objects whose distance $l_{Cn\text{-}C0}$ from the own vehicle is the shortest is determined as the first preceding object Cf. The first preceding object Cf is determined, for the purpose of effecting the ACC and PCS controls of the own vehicle, so as to avoid a crashing of the own vehicle with this first preceding object Cf and protect the occupant of the own vehicle upon its crashing with the first preceding object Cf. The first preceding object Cf may be a first preceding vehicle C1 running immediately in front of the own vehicle C0, as sown in FIG. 1.

Step S202 is followed by step S203 to obtain or calculate the distance $l_{Cf\text{-}C0}$ between the first preceding object Cf and the own vehicle C0, the relative speed $V_{Cf\text{-}C0}$ of the first preceding object Cf and the own vehicle C0, an arrival time $Ta_{Cf\text{-}C0}$, a crashing time $Tb_{Cf\text{-}C0}$, and a moving speed $V_{Cf}$ of the first preceding object Cf. The arrival time $Ta_{Cf\text{-}C0}$ is a time up to an expected moment at which the own vehicle C0 arrives at the present position of the first preceding object Cf. The crashing time $Tb_{Cf\text{-}C0}$ is a time up to an expected moment at which the own vehicle C0 has crashed with the first preceding object Cf. The arrival time $Ta_{Cf\text{-}C0}$ and the crashing time $Tb_{Cf\text{-}C0}$ are relationship parameters, more specifically, relationship values indicative of a relationship between the own vehicle C0 and the first preceding object Cf. Described in detail, the distance $l_{Cf\text{-}C0}$ and the relative speed $V_{Cf\text{-}C0}$ are those obtained by the radar device 14 for the first preceding object Cf, and the arrival time $Ta_{Cf\text{-}C0}$ is calculated by dividing the distance $l_{Cf\text{-}C0}$ by the running speed $V_{C0}$ of the own vehicle C0 detected by the wheel speed sensors 64, while the crashing time $Tb_{Cf\text{-}C0}$ is calculated by dividing the distance $l_{Cf\text{-}C0}$ by the relative speed $V_{Cf\text{-}C0}$. The moving speed $V_{Cf}$ of the first preceding object Cf is calculated by subtracting the relative speed $V_{Cf\text{-}C0}$ from the moving speed $V_{C0}$ of the own vehicle C0. When the first preceding object Cf is a first preceding vehicle in front of the own vehicle C0, the arrival time $Ta_{Cf\text{-}C0}$ may be called the "vehicle-to-vehicle time", and the moving speed $V_{Cf}$ of the object Cf is the running speed of the preceding vehicle, which is zero when the vehicle is stationary.

Then, the control flow goes to step S204 to determine whether any non-first preceding object exists in the own lane OL and in front of the first preceding object Cf. If a negative decision (NO) is obtained in step S204, the control flow goes to step S4 of the crash-safe control program of FIG. 6, that is, to the second routine for control mode determination. If an affirmative decision (YES) is obtained in step S204, the control flow goes to step S205 to determine the second preceding object Cff existing in the own lane OL and immediately in front of the first preceding object Cf. If only one non-first preceding object exists in the own lane OL and in front of the first preceding object Cf this non-first preceding object is determined as the second preceding object Cff. If a plurality of non-first preceding objects Cn exist in the own lane OL and in front of the first preceding object Cf, one of the non-first preceding objects Cn whose distance $l_{Cn\text{-}C0}$ from the own vehicle C0 is the shortest is determined as the second preceding object Cff. The second preceding object Cff may be the second preceding vehicle in front of the first preceding object Cf. In the example of FIG. 8, the preceding vehicle C4 is the second preceding vehicle Cff existing in the own lane OL and immediately in front of the first preceding vehicle C1.

Step S205 is followed by step S206 to obtain or calculate the distance $l_{Cff\text{-}Cf}$ between the second preceding object Cff and the first preceding object Cf, the relative speed $V_{Cff\text{-}Cf}$ of the second and first preceding objects Cff, Cf, an arrival time $Ta_{Cff\text{-}Cf}$, a crashing time $Tb_{Cff\text{-}Cf}$, a moving speed $V_{Cff}$ of the second preceding object Cff, and a deceleration value $G_{Cff}$ of the second preceding object Cff. The arrival time $Ta_{Cff\text{-}Cf}$ is a time which is expected to pass until the first preceding object Cf arrives at the present position of the second preceding object Cff. The crashing time $Tb_{Cff\text{-}Cf}$ is a time until the first preceding object Cf has collided or crashed with the second preceding object Cff. The arrival time and crashing time $Ta_{Cff\text{-}Cf}$ and $Tb_{Cff\text{-}Cf}$ are relationship parameters, more specifically, relationship values indicative of a relationship between the first and second preceding objects Cf. Cff. Described in detail, the distance $l_{Cff\text{-}Cf}$ is calculated by subtracting the distance $l_{Cn\text{-}C0}$ between the own vehicle C0 and the fist preceding object Cf, from the distance $l_{Cn\text{-}C0}$ between the own vehicle C0 and the second preceding object Cff. These distances $l_{Cn\text{-}C0}$ of the first and second preceding objects Cf. Cff from the own vehicle C0 are those detected by the radar device 14. The relative speed $V_{Cff\text{-}Cf}$ is calculated by subtracting the detected relative speed $V_{Cn\text{-}C0}$ of the own object C0 and the first preceding object Cf from the relative speed $V_{Cn\text{-}C0}$ of the own object C0 and the second preceding object Cff. The arrival time $Ta_{Cff\text{-}Cf}$ is calculated by dividing the distance $l_{Cff\text{-}Cf}$ by the already calculated moving speed $V_{Cf}$ of the first preceding object Cf; while the crashing time $Tb_{Cff\text{-}Cf}$ is calculated by dividing the distance $l_{Cff\text{-}Cf}$ by the relative speed $V_{Cff\text{-}Cf}$. The moving speed $V_{Cff}$ of the second preceding object Cff is calculated by subtracting the calculated relative speed $V_{Cff\text{-}Cf}$ from the running speed $V_{C0}$ of the own vehicle C0. To calculate the deceleration value $G_{Cff}$, the crash-safe ECU 10 stores the moving speed $V_{Cff}$ of the second preceding object Cff which was calculated in the last cycle of execution of the routine of FIG. 12. The deceleration value $G_{Cff}$ is calculated by dividing a difference between the two moving speed values $V_{Cff}$ calculated in the last and present cycles of execution of the routine of FIG. 12, by a predetermined cycle time of execution of the routine. One cycle of execution of the routine of FIG. 12 is terminated upon completion of the calculation in step S206.

iii) First Routine for Control Mode Determination

Figure 6:
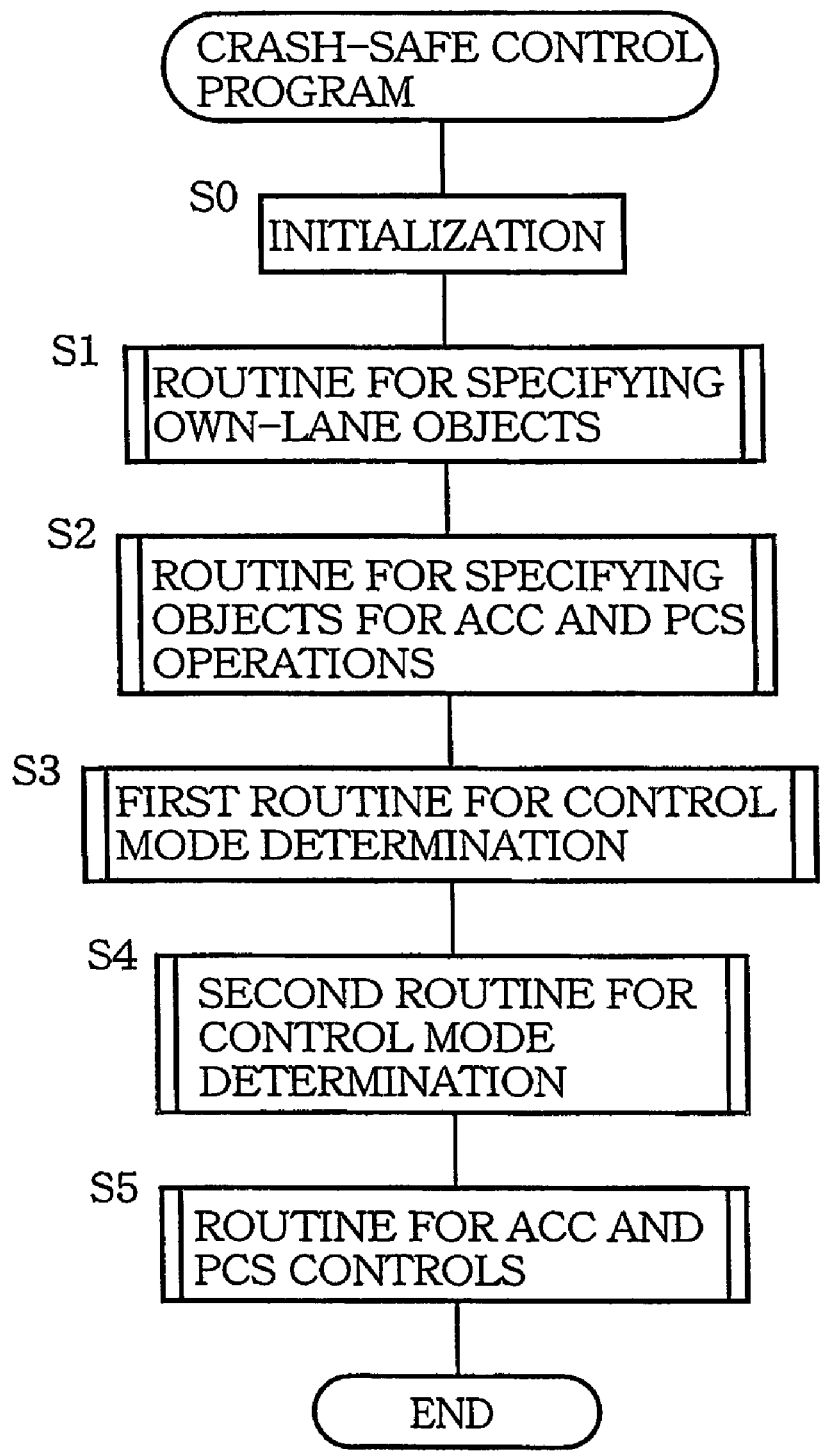
FIG. 6 is a flow chart illustrating a crash-safe control program executed by a crash-safe ECU of the vehicle control system.
Figure 13:
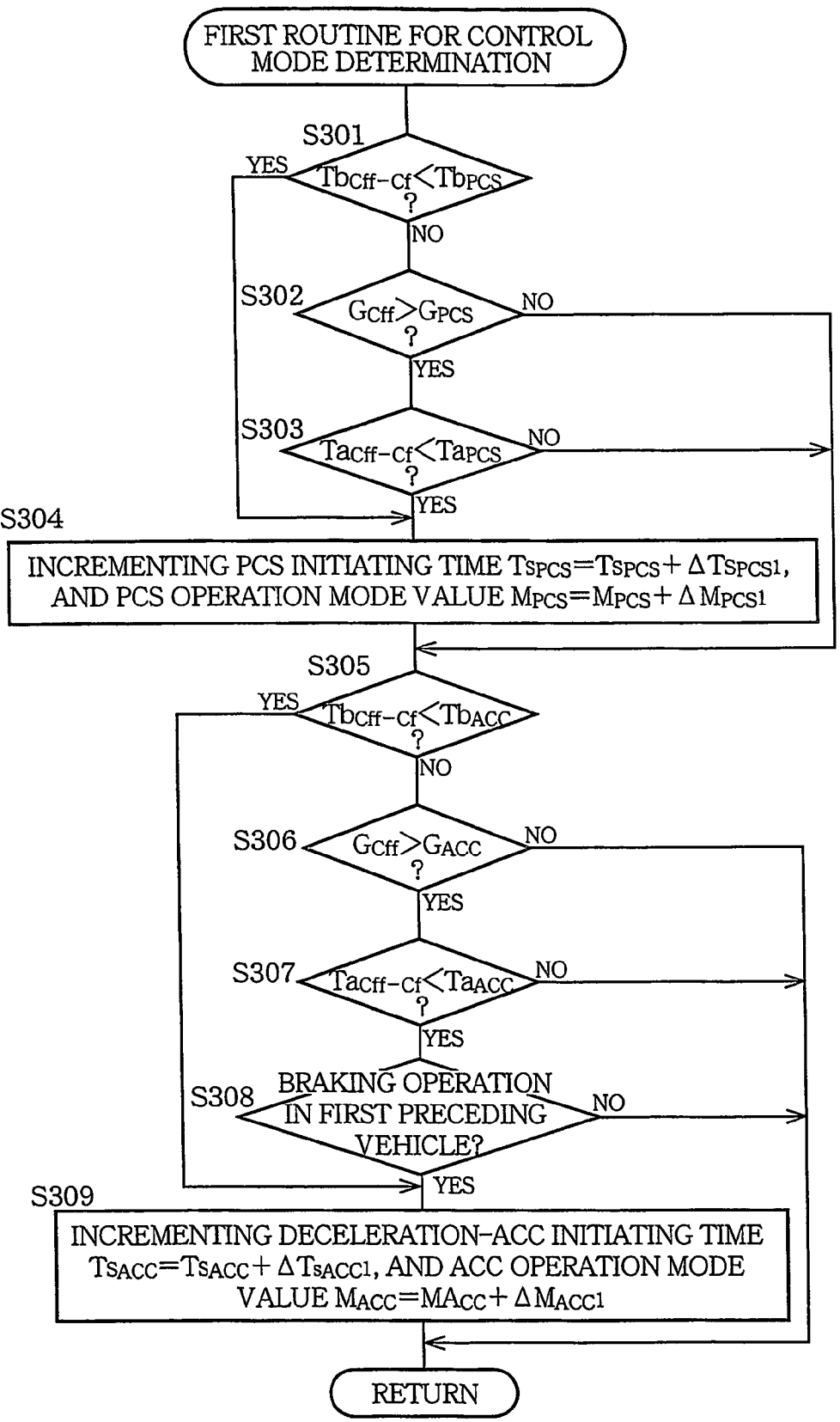
FIG. 13 is a flow chart illustrating a first routine for control mode determination, which is executed in step S3 of the crash-safe control program of FIG. 6.

The first control mode determining routine in step S3 of the crash-safe control program of FIG. 6 is illustrated in detail in the flow chart of FIG. 13. This routine is provided to determine the control modes for the ACC and PCS controls to be effected in step S5. Described in detail, the present routine is executed for changing the control modes for the ACC and PCS controls, on the basis of a relationship between the first preceding object Cf and the second preceding object Cff. A change in the control modes is effective particularly where the first preceding object Cf is the first preceding vehicle C1, as in the example of FIG. 8. In this sense, the routine of FIG. 13 will be explained where the first preceding object Cf is the first preceding vehicle. Steps S301-S304 of the routine are implemented for determining the control mode for the PCS control, while steps S305-S309 of the routine are implemented for determining the control mode for the ACC control.

The routine of FIG. 13 is initiated with step S301 to determine whether the crashing time $Tb_{Cff-Cf}$ of the first preceding vehicle Cf with respect to the second preceding object Cff is shorter than a predetermined threshold time $Tb_{PCS}$ (e.g., 0.65 sec). Namely, step S301 is implemented to determine, on the basis of the crashing time $Tb_{Cff-Cf}$, whether there is a high possibility of crashing or collision of the first preceding vehicle Cf with the second preceding object Cff. This determination, which is made for determining the control mode for the PCS control, is made to determine whether there is a high possibility of crashing or collision of the own vehicle C0 with the first preceding vehicle Cff. Determinations in steps S302 and S303 following step S301 are effective where the second preceding object Cff is the second preceding vehicle Cf. These steps S302 and S303 are implemented to determine whether there is a high possibility of crashing or collision between the first and second preceding vehicles Cf, Cff. Described more specifically, step S302 is implemented to determine whether the deceleration value $G_{Cf}$ of the second preceding vehicle Cff is higher than a predetermined threshold value $G_{PCS}$ (e.g., 0.5 G), and step S303 is implemented to determine whether the time required for the first preceding vehicle Cff to arrive at the present position of the second preceding vehicle Cff, that is, the vehicle-to-vehicle time or critical time $Ta_{Cff-Cf}$ of the first and second preceding vehicles Cf Cff is shorter than a predetermined threshold time $Ta_{PCS}$ (e.g., 1.0 sec). Where an abrupt brake is applied to the second preceding vehicle Cff while the distance between the first and second preceding vehicles Cf, Cff is comparatively short, for example, it is determined that there is a high possibility of crashing or collision between the first and second preceding vehicles Cf, Cff, and it is therefore determined that there is a high possibility of crashing or collision between the own vehicle C0 and the first preceding vehicle Cf. Step S304 is implemented when an affirmative decision (YES) is obtained in step S301, or when affirmative decisions (YES) are obtained in both of steps S302 and S303.

Step S304 is implemented to change or increment a PCS initiating time $Ts_{PCS}$ and a PCS operation mode value $M_{PCS}$. The PCS initiating time $Ts_{PCS}$ defines a moment of initiation of operations of appropriate ones of the above-described operating devices (32-56) in the PCS control, while the PCS operation mode value $M_{PCS}$ indicates the operation mode of those operating devices. The PCS initiating time $Ts_{PCS}$ is a threshold time (e.g., 1.0 sec) which is determined or updated in relation to the crashing time $Tb_{Cf-C0}$ of the first preceding vehicle Cf and the own vehicle C0 and which is used in step S502 in the ACC and PCS control routine which will be described by reference to the flow chart of FIG. 16. That is, the operations of the appropriate operating devices (e.g., brake actuator 44 and seatbelt actuator 52) for the PCS control are initiated when the crashing time $Tb_{Cf-C0}$ has become equal to or shorter than the threshold time $Ts_{PCS}$. Each time step S304 is implemented, the PCS initiating time $Ts_{PCS}$ is incremented by a predetermined amount $\Delta Ts_{PCS1}$ (e.g., 0.2 sec), so that the moment of initiation of operations of the appropriate operating devices is advanced by the predetermined amount $\Delta Ts_{PCS1}$. Thus, the control mode for the PCS control is changed, in respect of the moment of initiation of operations of the operating devices for the PCS control. On the other hand, the PCS operation mode value $M_{PCS}$ is a parameter which defines a magnitude of an effect to be achieved by the operations of the operating devices in the PCS control. The PCS operation mode value $M_{PCS}$ is initially set at zero, and is incremented by a predetermined amount $\Delta M_{PCS1}$ (e.g., 1) to increment the magnitude of the effect each time step S403 is implemented. Thus, the control mode for the PCS control is changed, in respect of the effect to be achieved by the PCS control.

Then, the control flow goes to step S305 to determine whether the crashing time $Tb_{Cff-Cf}$ of the first preceding vehicle Cf with respect to the second preceding object Cff is shorter than a predetermined threshold time $Tb_{ACC}$ (e.g., 1.0 sec). Namely, step S305 is implemented to determine, on the basis of the crashing time $Tb_{Cff-Cf}$, whether there is a high possibility of crashing or collision of the first preceding vehicle Cf with the second preceding object Cff. This determination, which is made for determining the control mode for the ACC control, is made to determine whether there is a high possibility of crashing or collision of the own vehicle C0 with the first preceding vehicle Cf. Determinations in steps S306 and S307 following step S305 are effective where the second preceding object Cff is the second preceding vehicle Cff. These steps S306 and S307 are implemented to determine whether there is a high possibility of crashing or collision between the first and second preceding vehicles Cf, Cff. Described more specifically, step S306 is implemented to determine whether the deceleration value $G_{Cf}$ of the second preceding vehicle Cff is higher than a predetermined threshold value $G_{ACC}$ (e.g., 0.2 G), and step S307 is implemented to determine whether the time until the first preceding vehicle Cf arrives at the present position of the second preceding vehicle Cff, that is, the critical or vehicle-to-vehicle time $Ta_{Cff-Cf}$ of the first and second preceding vehicles Cf, Cff is shorter than a predetermined threshold time $Ta_{ACC}$ (e.g., 2.0 sec). Step S307 is followed by step S308 to determine whether a brake is applied to the first preceding vehicle Cf This determination in step S308 is implemented by determining whether the brake lamp of the brake device of the first preceding device Cf is in the illuminated state, on the basis of the operating-state information obtained by the image-depending-information obtaining device 20, or the operating state of the brake device detected by the communication device 70. As in the PCS control, it is determined that there is a high possibility of crashing between the first and second preceding vehicles Cf Cff, where an abrupt brake is applied to the second preceding vehicle Cff while the first preceding vehicle Cf is running at a comparatively high speed and while the distance between the first and second preceding vehicles Cf, Cff is comparatively short. In this case, it is determined that there is a high possibility of crashing of the own vehicle C0 with the first preceding vehicle Cf. Step S309 is implemented when an affirmative decision (YES) is obtained in step S305, or when affirmative decisions (YES) are obtained in all of three steps S306, S307 and S308.

Step S309 is implemented to change or increment an ACC initiating time $Ts_{ACC}$ and an ACC operation mode value $M_{ACC}$. The ACC initiating time $TS_{ACC}$ defines a moment of initiation of operations of appropriate ones of the above-described operating devices in the ACC control (more precisely, electronic throttle actuator 34, transmission actuator 48, and brake actuator 44 in a deceleration-ACC control operation which will be described), while the ACC operation mode value $M_{ACC}$ indicates the operation mode of the operating devices. The ACC initiating time $Ts_{ACC}$ is a threshold time which is determined or updated in relation to the crashing time $Tb_{Cf-C0}$ of the first preceding vehicle Cf and the own vehicle C0 and which is used in step S507 in the ACC and PCS control routine of FIG. 16. That is, the operations of the appropriate operating devices for the ACC control are initiated when the crashing time $Tb_{Cf-C0}$ has become equal to or shorter than the threshold time $Ts_{ACC}$. The ACC initiating time $Ts_{ACC}$ (threshold time) may be held constant (e.g., 2.0 sec) or may be selected from a plurality of values (e.g., 2.4 sec, 2.0 sec and 1.8 sec) depending upon the weather, time (daytime or nighttime) or any other environmental factors. Each time step S309 is implemented, the ACC initiating time $Ts_{ACC}$ is incremented by a predetermined amount $\Delta Ts_{ACC1}$ (e.g., 0.4 sec), so that the moment of initiation of operations of the operating devices is advanced by the predetermined value $\Delta Ts_{ACC1}$. Thus, the control mode for the ACC control is changed, in respect of the moment of initiation of operations of the operating devices for the ACC control. On the other hand, the ACC operation mode value $M_{ACC}$ is a parameter which defines a magnitude of an effect to be achieved by the operations of the operating devices in the ACC control. The ACC operation mode value $M_{ACC}$ is initially set at zero, and is incremented by a predetermined amount $\Delta M_{ACC1}$ (e.g., 1) to increment the magnitude of the effect each time step S309 is implemented. Thus, the control mode for the ACC control is changed, in respect of the effect to be achieved by the ACC control. The PCS initiating time $Ts_{PSC}$, PCS operation mode value $M_{PCS}$, ACC initiating time $Ts_{ACC}$ and ACC operation mode value $M_{ACC}$ are reset in the initialization step S1 of the crash-safe control program of FIG. 6 each time this control program is executed.

iv) Second Routine for Control Mode Determination

Figure 14:
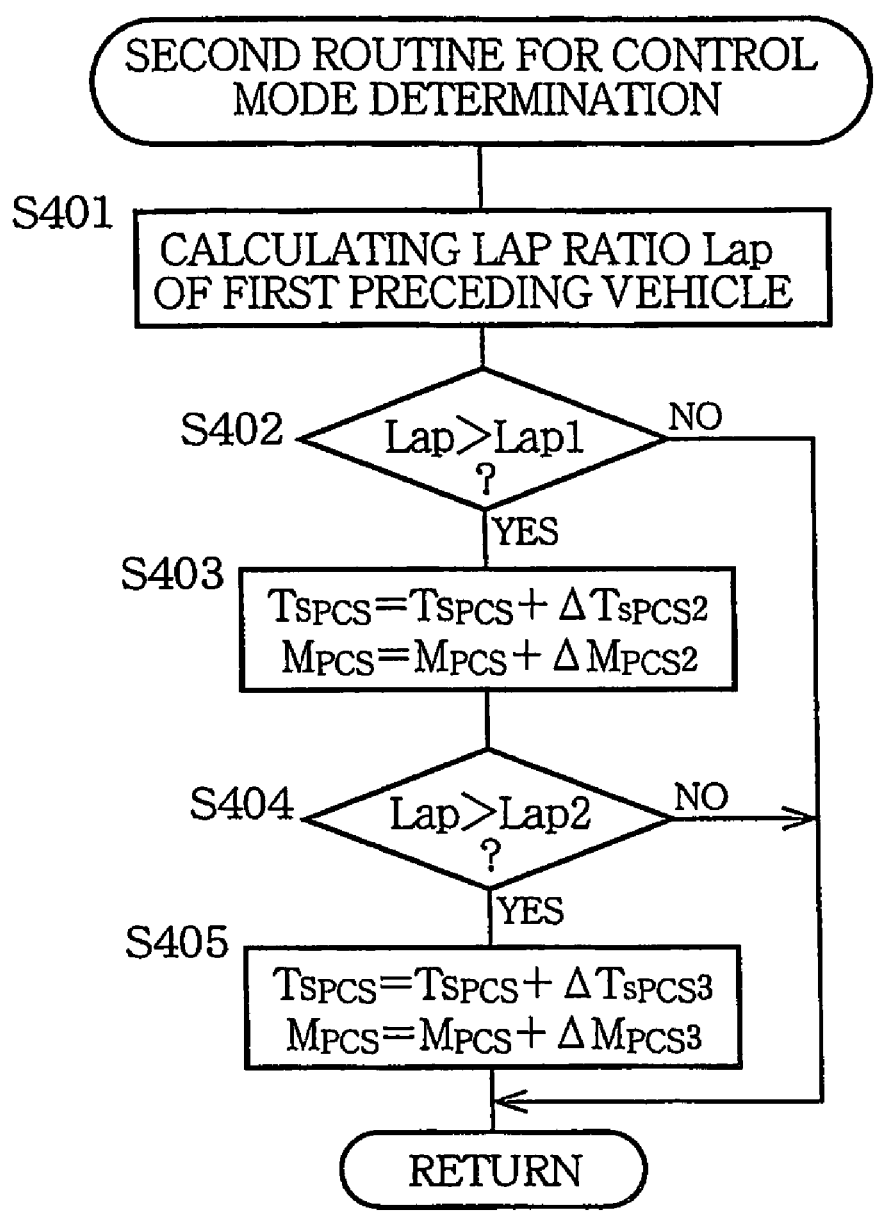
FIG. 14 is a flow chart illustrating a second routine for control mode determination, which is executed in step S4 of the crash-safe control program of FIG. 6.

The second control mode determining routine in step S4 of the crash-safe control program FIG. 6 is illustrated in detail in the flow chart of FIG. 14. This routine is provided to determine the control mode for the PCS control to be effected in step S5. Described in detail, the present routine is executed for changing the control mode for the PCS control, on the basis of a relationship between the first preceding object Cf and the own vehicle C0, more specifically, on the basis of a lap ratio Lap of the own vehicle C0 with respect to the first preceding object Cf, which is expected in the event of a crashing therebetween. The PCS control on the basis of the lap ratio Lap is effective not only where the first preceding object Cf is the first preceding vehicle, but also where the first preceding object Cf is a stationary object.

The routine of FIG. 14 is initiated with step S401 to calculate the lap ratio in the form of a lap percentage Lap(%) of the own vehicle C0 with respect to the first preceding object Cf, which is expected if a crashing between the own vehicle C0 and the first preceding object Cf takes place. The lap percentage Lap(%) represents a percent value of an overlapping width Ws of the own vehicle C0 with respect to its overall width $W_{C0}$, which is expected in the event where the own vehicle C0 collides with the preceding object Cf over the overlapping width Ws, as indicated in an example of FIG. 15A wherein the own vehicle C0 collides with the first preceding vehicle Cf. The lap percentage Lap(%) is represented by the following equation:

$$Lap(\%) = (W_{C0}/2 - (|\Delta Q(Cf)| - W_{Cf}/2)) \times 100/W_{C0}$$

Figures 15A, 15B:
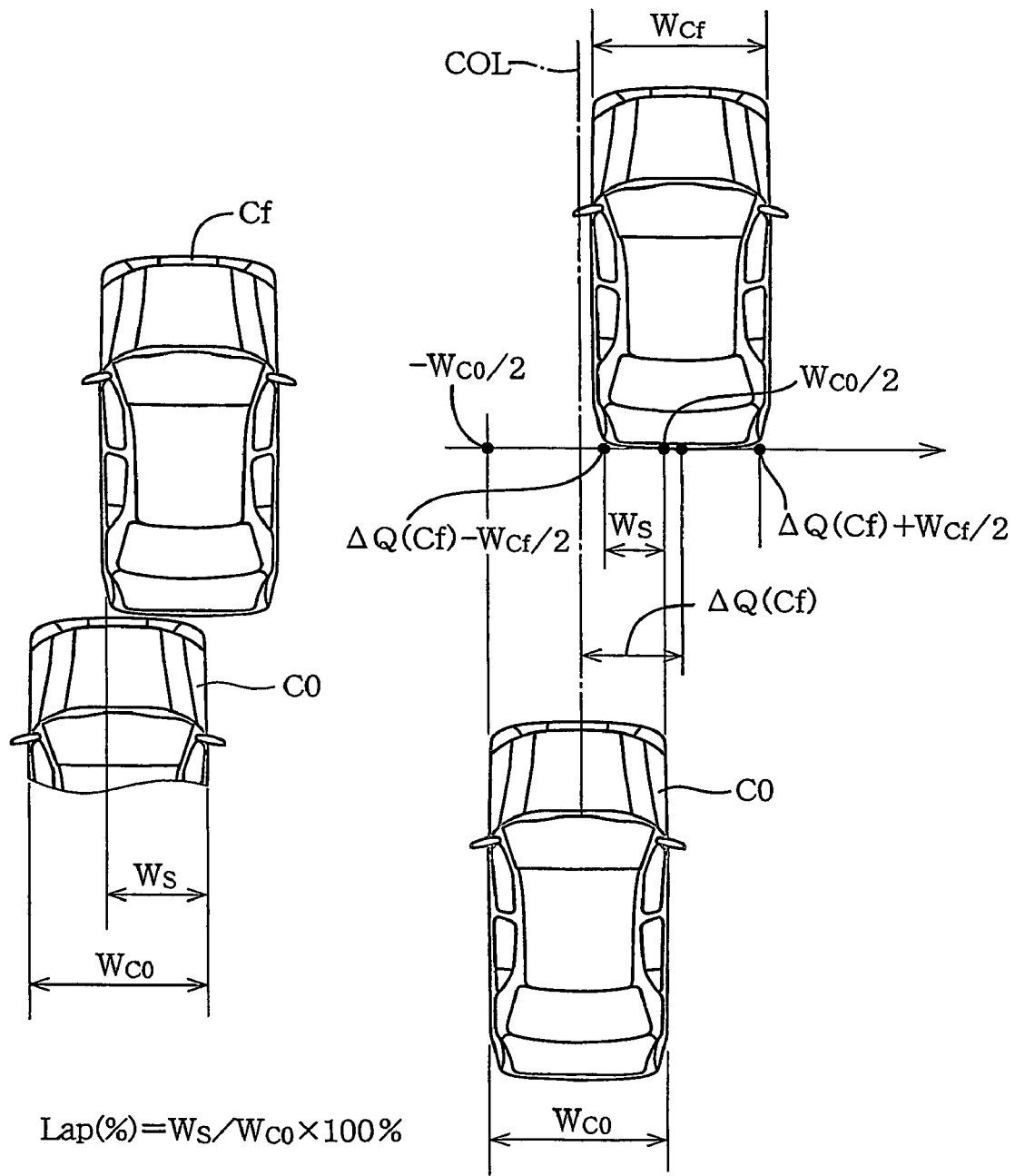
FIGS. 15A and 15B are views for explaining a lap ratio of the own vehicle and a preceding object, which is a parameter for changing the PCS control mode.

As indicated in FIG. 15B, the lap percentage Lap(%) is calculated on the basis of the width $W_{C0}$ of the own vehicle C0, the width $W_{Cf}$ of the first preceding object Cf, the amount of deviation $\Delta Q(CF)$ of the widthwise center of the first preceding object Cf from the centerline CL of the own vehicle C0, and the overlapping width Ws of the own vehicle C0. In this example, it is assumed that the width $W_{Cf}$ of the first preceding object Cf is not smaller than the width $W_{C0}$ of the own vehicle C0. In step S401, the lap percentage Lap(%) is calculated according to the equation specified above.

Step S401 is followed by step S402 to determine whether the calculated lap percentage Lap(%) is higher than a predetermined first threshold value Lap1(%) (e.g., 20%). If a negative decision (NO) is obtained in step S402, one cycle of execution of the routine of FIG. 14 is terminated. If an affirmative decision (YES) is obtained in step S402, the control flow goes to step S403 to increment the PCS initiating time $Ts_{PCS}$ by a predetermined amount $\Delta Ts_{PCS2}$ (e.g., 0.2 sec), so that the moment of initiation of operations of the operating devices is advanced by the predetermined amount $\Delta Ts_{PCS2}$, and to increment the PCS operation mode value $M_{PCS}$ by a predetermined amount $\Delta M_{PCS2}$ (e.g., 1).

Step S403 is followed by step S404 to determine whether the calculated lap percentage Lap(%) is higher than a predetermined second threshold value Lap2(%) (e.g., 80%), which is higher than the first threshold value Lap1(%). If a negative decision (NO) is obtained in step S404, one cycle of execution of the routine of FIG. 14 is terminated. If an affirmative decision (YES) is obtained in step S404, the control flow goes to step S405 to further increment the PCS initiating time $Ts_{PCS}$ by a predetermined amount $\Delta Ts_{PCS3}$ (e.g., 0.2 sec), so that the moment of initiation of operations of the operating devices is advanced by the predetermined amount $\Delta Ts_{PCS3}$, and to further increment the PCS operation mode value $M_{PCS}$ by a predetermined amount $\Delta M_{PCS3}$ (e.g., 1). According to the routine of FIG. 14, the PCS control mode is changed in steps according to the lap percentage Lap(%) of the own vehicle C0 with respect to the first preceding object Cf.

v) ACC and PCS Control Routine

Figure 16:
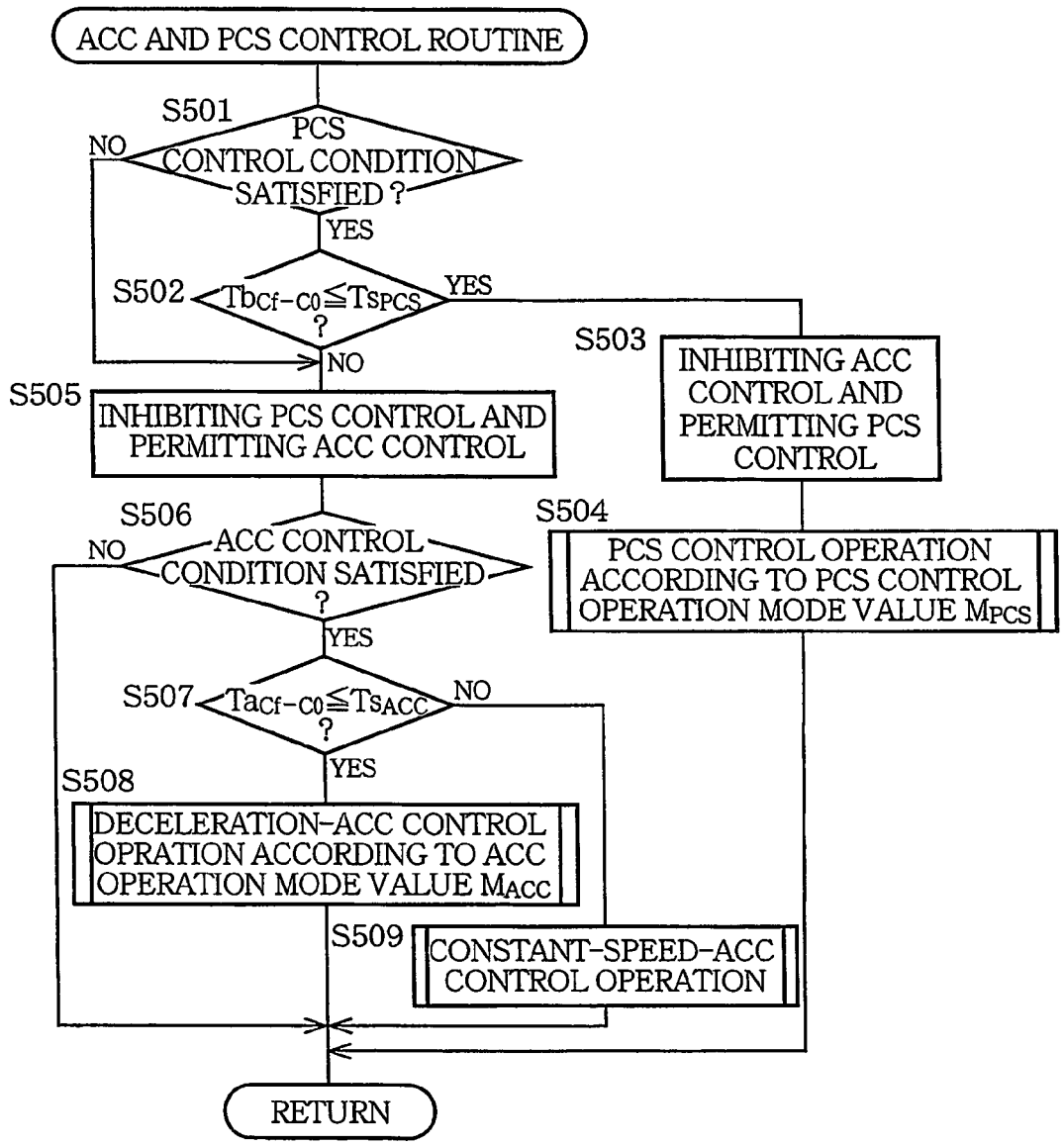
FIG. 16 is a flow chart illustrating a routine for ACC and PCS controls, which is executed in step S5 of the crash-safe control program of FIG. 6.

The ACC and PCS control routine in step 5 of the crash-safe control program of FIG. 6 is illustrated in detail in the flow chart of FIG. 16. This routine is provided to effect the ACC and PCS controls of the operating devices (32-56) of the own vehicle C0, in the control modes determined in the first and second routines for control mode determination in steps S3 and S4.

The routine of FIG. 16 is initiated with step S501 to determine whether a predetermined condition for initiating the PCS control is satisfied. This condition may be a condition that must be controlled to initiate an ordinary PCS control of the own vehicle C0. For instance, the predetermined condition is satisfied when the running speed $V_{C0}$ of the own vehicle C0 is higher than a predetermined value $Vs_{PCS}$. If a negative decision (NO) is obtained in step S501, the PCS control is not initiated, that is, the control flow goes to step S505 while skipping the following step S502. If an affirmative decision (YES) is obtained in step S501, the control flow goes to step S502 to determine whether the crashing time $Tb_{Cf-C0}$ of the own vehicle C0 and the first preceding vehicle Cf is equal to or shorter than the PCS initiating time $Ts_{PCS}$ updated in step S304. If a negative decision (NO) is obtained in step S502, the control flow goes to step S505 to inhibit the PCS control and permit the ACC control. If an affirmative decision (YES) is obtained in step S502, the control flow goes to step S503 to inhibit the ACC control and permit the PCS control. Step S503 is followed by step S504 to initiate the PCS control operation, in the control mode according to the PCS operation mode value $M_{PCS}$ updated in step S304. This PCS control operation will be described below. Upon completion of step S504, one cycle of execution of the ACC and PCS control routine of FIG. 16 is terminated.

Step S505 is followed by step S506 to determine whether a predetermined condition for initiating the ACC control is satisfied. This condition may be a condition that must be controlled to initiate an ordinary ACC control of the own vehicle C0. For instance, the predetermined condition is satisfied when the running speed $V_{C0}$ of the own vehicle C0 is higher than a predetermined value $Vs_{ACC}$ while an ACC control switch is in its ON state and while the brake operating member (e.g., brake pedal) is not in operation. If a negative decision (NO) is obtained in step S506, the ACC control is not initiated, and one cycle of execution of the present routine is terminated. If an affirmative decision (YES) is obtained in step S506, the control flow goes to step S507 to determine whether the crashing time $Ts_{Cf-C0}$ of the own vehicle C0 and the first preceding vehicle Cf is equal to or shorter than the ACC initiating time $Ts_{ACC}$ updated in step S309. If a negative decision (NO) is obtained in step S507, the control flow goes to step S509 to initiate a constant-speed-ACC operation of the electronic throttle actuator 34 of the own vehicle C0, and one cycle of execution of the present routine is terminated. If an affirmative decision (YES) is obtained in step S507, the control flow goes to step S508 to initiate the deceleration-Acc operation of the operating devices (34, 38, 44) in the control mode according to the ACC operation mode value $M_{ACC}$ updated in step S309, and one cycle of execution of the present routine is terminated. These constant-speed-Acc operation and the deceleration-ACC operation of the operating devices (32-56) will be described below.

<Operations of Operating Devices (32-56) in ACC and PCS Controls

The ACC and PCS controls per se are well known in the art. the crash-safe vehicle control system according to the present embodiment is basically arranged to effect the ACC and PCS controls in a manner known in the art. Therefore, only those aspects of the ACC and PCS control which are characteristic of the present invention will be described.

The ACC control is roughly classified into the constant-ACC control operation and the deceleration-ACC control operation. The constant-speed-ACC control operation is performed while the vehicle-to-vehicle time $Ta_{Cf-C0}$ of the own vehicle C0 and the first preceding vehicle Cf is longer than the threshold value $Ts_{ACC}$ (ACC initiating time). In the constant-speed-ACC control operation, the electronic throttle actuator 34 of the engine device is controlled such that the running speed VC0 of the own vehicle C0 is maintained at an ACC speed $V_{ACC}$ which is selected by the vehicle operator within a predetermined range (e.g., 40-100 km/h). Described in detail, the crash-safe ECU 10 calculates a target acceleration/deceleration value of the own vehicle C0 on the basis of a difference between the selected ACC speed $V_{ACC}$ and the detected running speed VC0, and applies an engine control signal corresponding to the calculated target acceleration/deceleration value, to the engine ECU 32 of the engine device, so that the engine ECU 32 controls the electronic throttle actuator 34 to control the output of the engine device, according to the engine control signal.

The deceleration-ACC control operation is performed while the vehicle-to-vehicle time $Ta_{Cf-C0}$ of the own vehicle C0 and the first preceding vehicle Cf is equal to or shorter than the threshold value $TS_{ACC}$ (ACC initiating time). In the constant-speed-ACC control operation, the electronic throttle actuator 34, transmission actuator 38 and brake actuator 44 of the own vehicle C0 are controlled on the basis of a difference between the vehicle-to-vehicle time $Ta_{Cf-C0}$ and the ACC initiating time $Ts_{ACC}$, and the relative speed $V_{Cf-C0}$ of the first preceding vehicle Cf and the own vehicle C0. Described in detail, the crash-safe ECU 10 calculates a target deceleration value G* of the own vehicle C0 on the basis of the above-indicated difference and the relative speed $V_{Cf-C0}$, and applies control signals corresponding to the calculated target deceleration value G*, to the engine ECU 32 of the engine device, the transmission ECU 36 of the transmission device and the brake ECU 42 of the brake device, so that the ECUs 32, 36, 42 control the respective electronic throttle actuator 34, transmission actuator 38 and brake actuator 44, for applying a braking force corresponding to the target deceleration value G* to the own vehicle C0. Described more specifically, only the electronic throttle actuator 34 is controlled to reduce the output of the engine device when the target deceleration value G* is lower than a predetermined first upper limit, and the transmission actuator 38 is also controlled to shift down the transmission device when the target deceleration value G* is higher than the first upper limit. When the target deceleration value G* is higher than a predetermined second upper limit higher than the first upper limit, the brake actuator 44 is controlled to apply a brake to the own vehicle C0. Thus, the deceleration-ACC control operation is performed in a selected one of three manners depending upon the calculated target deceleration value G* of the own vehicle C0.

When the ACC initiating time $Ts_{ACC}$ is incremented in step S309 in the first routine for control mode determination, the threshold value $Ts_{ACC}$ for the vehicle-to-vehicle time $Ta_{Cf-C0}$ used in step S507 is accordingly incremented, so that the moment of initiation of the deceleration-ACC control operation is accordingly advanced, as described above. In this case, the ACC operation mode value $M_{ACC}$ (initially set at "0") is also incremented, and the calculated target deceleration value G* is increased according to the incremented ACC operation mode value $M_{ACC}$. When the value $M_{ACC}$ is incremented to "1", for example, the calculated target deceleration value G* is multiplied by 1.2. Since each of the appropriate operating devices (engine device, transmission device and brake device) is controlled according to the target deceleration value G*, the moments of initiation of the transmission device and the brake device are advanced, and the braking forces generated by the transmission and brake device are increased, as a result of an increase of the target deceleration value G* according to the ACC control mode changed in step S309. For example, fluid pressures in hydraulically operated wheel brake cylinders of the brake actuator 44 of the brake device are raised to increase the braking force applied to the own vehicle C0, according to an increase in the target deceleration value G* as a result of incremental increases in the ACC initiating time and the ACC operation mode value $M_{ACC}$ in step S309.

In the PCS control, the brake device is set ready for operation, and the seatbelt device is controlled, for instance. The brake device is set ready for operation, in advance of an operation by the vehicle operator of the brake operating member (brake pedal) which is expected to be performed immediately before a crashing of the own vehicle C0 with the first preceding object Cf. Described more specifically, the crash-safe ECU 10 applies to the brake ECU 42 the control signal for initiating the PCS control operation when the crashing time $Tb_{Cf\text{-}C0}$ of the own vehicle C0 and the first preceding object Cf has become equal to or shorter than the PCS initiating time $Ts_{PCS}$ (threshold value), as described above. In this case, a hydraulic pump provided as a part of the brake actuator 44 is turned on. When the PCS initiating time $Ts_{PCS}$ and the PCS operation mode value $M_{PCS}$ are incremented in at least one the first and second routines for control mode determination in steps S3 and S4, the moment at which the hydraulic pump is turned on or started is advanced according to the incremented PCS initiating time $Ts_{PCS}$, and the hydraulic pump is controlled so as to increase the target fluid pressures in the wheel brake cylinders according to the incremented PCS operation mode value $M_{PCS}$. Thus, an increase in the PCS initiating time $Ts_{PCS}$ and PCS operation mode value $M_{PCS}$ will start and control the hydraulic pump so that the brake device is set ready for operation to increase the braking force to be applied to the own vehicle C0. In the PCS control, too, the engine device and the transmission device as well as the brake device may be controlled, so as to apply an abrupt emergency brake to the own vehicle C0, for avoiding a crashing of the own vehicle with the first preceding object Cf, as in the deceleration-ACC control operation. In this emergency brake application in the PCS control, the braking force to be generated is considerably larger than that in the ordinary deceleration-ACC control operation.

The seatbelt actuator 42 of the seatbelt device is provided with pre-tensioners for pre-tensioning the appropriate seatbelts. In the PCS control, these pre-tensioners are activated prior to a crashing of the own vehicle C0. When the above-described predetermined condition for initiating the PCS control is satisfied, the PCS control operation is initiated, that is, the crash-safe ECU 10 applies to the seatbelt ECU 50 control signals for activating the pre-tensioners. When the PCS initiating time $Ts_{PCS}$ and the PCS operation mode value $M_{PCS}$ are incremented, the moment at which the pre-tensioners are activated is advanced according to the incremented PCS initiating time $Ts_{PCS}$, and the pre-tension values given to the pre-tensioners under the control of the seatbelt ECU 50 are increased according to the incremented PCS operation mode value $M_{PCS}$. For instance, the pre-tension values are 80N, 100N, 150N and 200N when the PCS operation mode value $M_{PCS}$ is 0, 1, 2 and 3, respectively. Thus, the effect to be achieved by the PCS control is increased with an increase in the PCS operation mode value $M_{PCS}$.

Immediately after the PCS control operation has been initiated, the brake lamp of the own vehicle C0 is turned on to inform a trailing vehicle or vehicles following the own vehicle C0, of a brake application to the own vehicle C0, for avoiding a crashing of the trailing vehicle or vehicles with the own vehicle C0. The brake lamp is also considered to an operating device to be controlled in the PCS control. The moment at which the brake lamp is turned on is changed depending upon the selected PCS control mode, for example, advanced by incrementing the PCS initiating time $Ts_{PCS}$. It is possible to inform the trailing vehicle or vehicles via the communication device 70 as well as the brake lamp, of a high possibility of crashing of the own vehicle C0 with the preceding object or objects. Further, the airbag device and any other devices for protecting the occupants of the own vehicle C0 may be controlled depending upon the selected PCS control mode, and the steering device including the steering actuator 48 may be controlled so as to avoid a crashing of the own vehicle C0 with the preceding object or objects. In this case, the moment of initiation of the control operation of the steering device and the amount of the control operation may be changed depending upon the selected PCS control mode.

<Functional Elements of Crash-Safe ECU 10>

Figure 17:
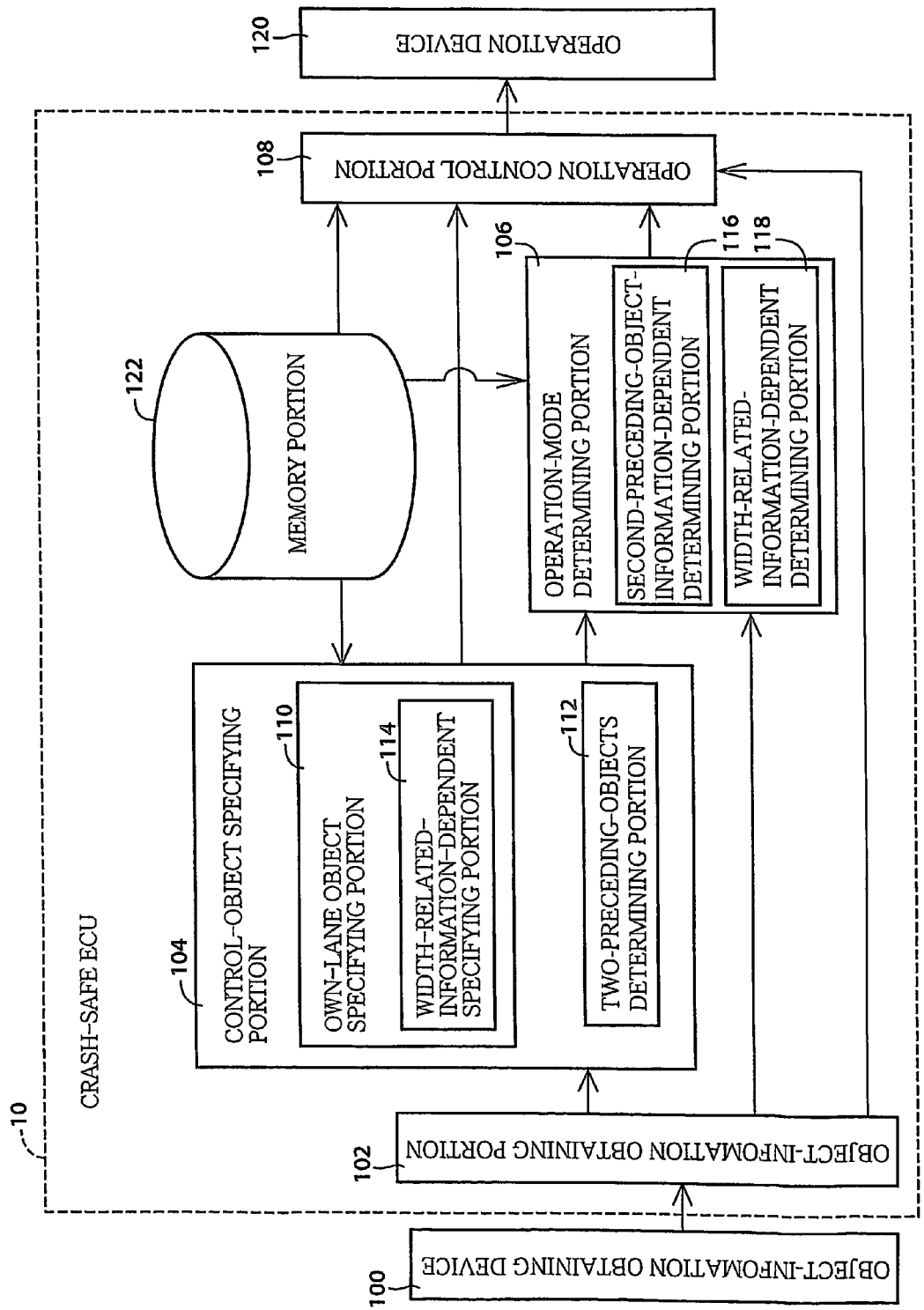
FIG. 17 is a block diagram showing functional elements of the crash-safe ECU of the crash-safe vehicle control system.

The crash-safe vehicle control system including the crash-safe ECU 10 which is arranged to execute the crash-safe control program of FIG. 6 (routines of FIGS. 7, 12-14 and 16) described above is considered to include functional elements shown in the block diagram of FIG. 17. These functional elements will be described by reference to FIG. 17. The crash-safe vehicle control system further includes an object-information obtaining device 100 which includes the radar device 14, image-dependent-information obtaining device 20 and communication device 70. The crash-safe ECU 10 includes: an object-information obtaining portion 102 arranged to receive the object information from the object-information obtaining device 100; a control-object specifying portion 104; an operation-mode determining portion 106; and an operation control portion 108. The object information obtained by the object-information obtaining portion 102 is used by the portions 104, 106, and 108.

The control-object specifying portion 104 is arranged to specify the preceding objects Cf, Cff as the control objects for the ACC and PCS controls, on the basis of the object information. It will be understood that the control-object specifying portion 104 is constituted by a portion of the crash-safe ECU 10 assigned to implement step S1 of FIG. 6 (own-lane object specifying routine of FIG. 7) and step S2 of FIG. 6 (ACC/PCS control objects specifying routine of FIG. 12). The control-object specifying portion 104 includes an own-lane object specifying portion 110 arranged to implement the step S1, and two-preceding-objects determining portion 112 arranged to implement the step S2 for specifying the first and second preceding objects Cf, Cff. Described in detail, the own-lane object specifying portion 110 is arranged to implement steps S106-S113 of FIG. 7 to specify the own-lane objects (each of which is at least partly located within the width of the own lane OL of the own vehicle C0), on the basis of the width-related information. These steps S106-S113 are considered to be a kind of a width-related-information-dependent control. That is, the own-lane object specifying portion 110 includes a width-related-information-dependent specifying portion 114 which is constituted by a portion of the crash-safe ECU 10 assigned to implement the steps S106-S113. The two-preceding-objects determining portion 112 is arranged to select the first preceding object (vehicle) Cf and the second preceding object (vehicle) Cff which immediately precedes the first preceding object Cf, from among the own-lane objects specified by the own-lane-object specifying portion 110, so that the specified objects Cf, Cff are controlled in the ACC and PCS controls.

The operation-mode determining portion 106 is arranged to determining the control modes in the ACC and PCS controls of the appropriate operating devices, on the basis of the control objects Cf. Cff specified by the control-object specifying portion 104, and the object information on the specified control objects Cf, Cff. It will be understood that the operation-mode determining portion 106 is constituted by portions of the crash-safe ECU 10 assigned to implement step S3 (first control mode determination routine of FIG. 13) and step S4 (second control mode determination routine of FIG. 14) of FIG. 6. The operation-mode determining portion 106 includes a second-preceding-object-information-dependent determining portion 116 arranged to implement the step S3, and a width-related-information-dependent determining portion 118 arranged to implement the step S4. The second-preceding-object-information -dependent determining portion 116 is arranged to determine the ACC and PCS control modes on the basis of the condition of a non-first preceding object in the form of the second preceding object Cff. In this respect, the determining portion 116 is considered to be effect a kind of a non-first-preceding-object-information-dependent control. Described in detail, the second-preceding-object-information-dependent determining portion 116 is arranged to determine the ACC and PCS control modes on the basis of at least the deceleration value $G_{Cf}$ of the second preceding vehicle Cff which is a non-first preceding object (existing in front of the first preceding vehicle Cf), and the arrival time $Ta_{Cff-Cf}$ and crashing time $Tb_{Cff-Cf}$ of the first preceding vehicle Cf with respect to the non-first preceding object Cff. The width-related-information-dependent determining portion 118 is arranged to estimate the lap ratio in the form of the lap percentage Lap(%) of the own vehicle C0 with respect to the first preceding object Cf, on the basis of the width-related information, and determine the PCS control mode on the basis of the estimated lap ratio. It will be understood that step S4 implemented by this width-related-information-dependent determining portion 118 is considered to be a kind of the width-related-information-dependent control.

The operation control portion 108 is arranged to control operating devices 120 such as the engine device, brake device and seatbelt device (described above), in control modes determined by the operation-mode determining portion 106, on the basis of the object information relating to the specified control objects or specific objects Cf, Cff. Namely, the operation control portion 108 is arranged to implement step S5 of FIG. 6 (ACC and PCS control routine of FIG. 16).

The crash-safe ECU 10 further includes a memory portion 122 for storing various control parameters, threshold values and other data which are used by the control-object specifying portion 104, operation-mode determining portion 106 and operation control portion 108. The data stored in the memory portion 122 include: width $W_{C0}$ of the own vehicle C0; threshold values $Ta_{PCS}$, $Ta_{ACC}$, $Tb_{PCS}$, $Tb_{ACC}$ for the arrival time $Ta_{Cff-Cf}$ and crashing time $Tb_{Cff-Cf}$; initial values of initiating time $Ts_{PCS}$, ACC initiating time $Ts_{ACC}$, PCS operation mode value $M_{PCS}$, and ACC operation mode value $M_{ACC}$; increment amounts $\Delta Ts_{PCS1-3}$ of the initiating times $Ts_{PCS}$ and $Ts_{ACC}$ and increment amounts $\Delta M_{PCS1-3}$ of the operation mode values $M_{PCS}$ and $M_{ACC}$; and threshold values Lap 1 and Lap 2 for the lap percentage Lap(%). These control parameters, threshold values, etc. stored in the memory portion 122 can be changed to change the conditions for initiating the PCS and ACC controls, and the PCS and ACC control modes.

The inventioned claimed is:

1. A crash-safe vehicle control system for controlling an own vehicle, comprising:
    an object-information obtaining device operable to obtain object information on each of at least one preceding object existing in front of the own vehicle, the object information including information relating to a position of each preceding object relative to the own vehicle;
    an operating device operable in the presence of a high possibility of crashing of the own vehicle with one of said at least one preceding object; and
    a crash-safe control device operable to control the operating device on the basis of the object information on said at least one preceding object obtained by the object-information obtaining device,
    and wherein said crash-safe control device is operable to effect a non-first-preceding-object-information-dependent control of said operating device, on the basis of non-first-preceding-object information obtained by said object-information obtaining device, in the presence of a high possibility of crashing of the own vehicle with a first preceding vehicle which is one of said at least one preceding object and which exists immediately in front of the own vehicle, the non-first-preceding-object information relating to at least one non-first preceding object each of which is one of said at least one preceding object and exists in front of the first preceding vehicle,
    said crash-safe control device being operable to estimate a possibility of crashing between the first preceding vehicle and said at least one non-first preceding object and control the operating device on the basis of the estimated possibility of crashing between the first preceding vehicle and the at least one non-first preceding object.

2. The crash-safe vehicle control system according to claim 1, wherein the object-information obtaining device includes an object-information obtaining radar device operable to detect a plurality of preceding objects which exist in front of the own vehicle and which lie on an own lane on which the own vehicle is to run, the object-information obtaining radar device being operable to obtain the object information on each of said at least one preceding object.

3. The crash-safe vehicle control system according to claim 2, wherein the object-information obtaining radar device of the object-information obtaining device is a millimeter wave type radar device.

4. The crash-safe vehicle control system according to claim 1, wherein the at least one non-first preceding object is a second preceding vehicle existing immediately in front of the first preceding vehicle, and the crash-safe control device is operable to estimate a possibility of crashing between the first and second preceding vehicles, and control the operating device on the basis of the estimated possibility of crashing between the first and second preceding vehicles.

5. The crash-safe vehicle control system according to claim 1, wherein the crash-safe control device is operable to control a moment of initiation of an operation of the operating device such that the moment of initiation when the possibility of crashing between the first vehicle and the at least one non-first preceding object is relatively high is advanced with respect to that when the possibility is relatively low.

6. The crash-safe vehicle control system according to claim 1, wherein the crash-safe control device is operable to control the operating device such that an effect to be achieved by the operation of the operating device when the possibility of crashing between the first vehicle and the at least one non-first preceding object is relatively high is increased with respect to that when the possibility is relatively low.

7. The crash-safe vehicle control system according to claim 1, wherein the crash-safe control device is operable to additionally effect a width-related-information-dependent control of said operating device on the basis of width-related information relating to at least one of a width and a widthwise position of at least one specific object selected from said at least one preceding object.

8. The crash-safe vehicle control system according to claim 7, wherein the object-information obtaining device includes a width-related-information obtaining device operable to obtain the width-related information relating to said at least one specific object.

9. The crash-safe vehicle control system according to claim 8, wherein the width-related-information obtaining device includes an object-imaging camera device operable to take an image of each of the at least one preceding object, and an image-data processing device operable to process image data representative of the image taken by the object-imaging camera device, for obtaining the width-related information on each of the at least one specific object.

10. The crash-safe vehicle control system according to claim 8, wherein the object-information obtaining device includes an object detecting radar device operable to detect said at least one preceding object, in addition to the width-related-information obtaining device.

11. The crash-safe vehicle control system according to claim 10, wherein the object detecting radar device is operable to obtain information relating to an approximate position of each of the at least one preceding object, and the width-related-information obtaining device is operable to obtain the width-related information on each of the at least one specific object, on the basis of the information relating to approximate position obtained by the object detecting radar device.

12. The crash-safe vehicle control system according to claim 10, wherein the width-related-information obtaining device selects said at least one specific object from said at least one preceding object detected by the object detecting radar device, and obtains the width-related information on each of the at least one specific object.

13. The crash-safe vehicle control system according to claim 7, wherein the crash-safe control device is operable to control the operating device on the basis of a wldthwlse center position of the at least one specific object represented by the width-related information.

14. The crash-safe vehicle control system according to claim 7, wherein the crash-safe control device is operable to control the operating device, on the basis of at least one of widthwise opposite positions of each of the at least one specific object which are represented by the width-related information.

15. The crash-safe vehicle control system according to claim 7, wherein the crash-safe control device is operable to estimate, on the basis of the width-related information of the at least one specific object, a lap ratio of the own vehicle and each of the at least one specific object, said lap ratio being a ratio of an overlapping width of the own vehicle with respect to its overall width, which is expected if the own vehicle collides with said each specific object over said overlapping width, the crash-safe control device being operable to control the operating device on the basis of the estimated lap ratio.

16. The crash-safe vehicle control system according to claim 15, wherein the crash-safe control device is operable to control a moment of initiation of an operation of the operating device such that the moment of initiation when the estimated lap ratio is relatively high is advanced with respect to that when the possibility is relatively low.

17. The crash-safe vehicle control system according to claim 15, wherein the crash-safe control device is operable to control the operating device such that an effect to be achieved by the operation of the operating device when the estimated lap ratio is relatively high is increased with respect to that when the estimated lap ratio is relatively low.

18. The crash-safe vehicle control system according to claim 7, wherein the crash-safe control device is operable to determine, on the basis of the width-related information on said at least one specific object, whether each of the at least one specific object lies on an own lane on which the own vehicle is to run, and control the operating device on the basis of a result of said determination.

19. The crash-safe vehicle control system according to claim 18, wherein the crash-safe control device is operable to determine that each of the at least one specific object lies on the own lane, when said each specific object is at least partly located within a width of the own lane.

20. The crash-safe vehicle control system according to claim 7, wherein the object-information obtaining device is operable to obtain the width-related information on each of at least one specific preceding vehicle each of which is one of said at least one specific object and is a preceding vehicle existing in front of the own vehicle, and the crash-safe control device is operable to control the operating device on the basis of the width-related information on each of the at least one specific preceding vehicle.

21. A crash-safe vehicle control system for controlling an own vehicle, comprising:
   an object-information obtaining device operable to obtain object information on each of at least one preceding object existing in front of the own vehicle, the object information including information relating to a position of each preceding object relative to the own vehicle;
   an operating device operable in the presence of a high possibility of crashing of the own vehicle with one of said at least one preceding object; and
   a crash-safe control device operable to control the operating device on the basis of the object information on said at least one preceding object obtained by the object-information obtaining device; and
   wherein said crash-safe control device is operable to effect a non-first-preceding-object-information-dependent control of said operating device, on the basis of non-first-preceding-object information obtained by said object-information obtaining device, in the presence of a high possibility of crashing of the own vehicle with a first preceding vehicle which is one of said at least one preceding object, and which exists immediately in front of the own vehicle, the non-first-preceding-object information relating to at least one non-first preceding object each of which is one of said at least one preceding object and exists in front of the first preceding vehicle,
   the object-information obtaining device obtaining the information on the first preceding vehicle, as the object information on one of said at least one preceding object, and the crash-safe control device is operable to estimate at least one relationship value indicative of a relationship between the first preceding vehicle and said at least one non-first preceding object, on the basis of the information on the first preceding vehicle and said non-first-preceding-object information on the at least one non-first preceding object, which have been obtained by the object-information obtaining device, said at least one relationship value being selected from a distance between the first preceding vehicle and one of the at least one non-first preceding object, a time up to a moment of arrival of the first preceding vehicle at a present position of said one non-first preceding object, and a time up to a moment of crashing of the fist preceding vehicle with said one non-first preceding object, the crash-safe control device controlling the operating device on the basis of the estimated at least one relationship value.

22. The crash-safe vehicle control system according to claim 21, wherein the object-information obtaining device obtains the information on a second preceding vehicle existing immediately in front of the first preceding vehicle, as the object information on said one non-first preceding object, and the crash-safe control device is operable to estimate, as the at least one relationship value, at least one of the distance between the first and second preceding vehicles, the time up to the moment of arrival of the first preceding vehicle with the second preceding vehicle, and the time up to the moment of crashing of the first preceding vehicle with the second preceding vehicle, on the basis of the information on the first preceding vehicle and the information on the second preceding vehicle, which have been obtained by the object-information obtaining device, the crash-safe control device controlling the operating device on the basis of the estimated at least one of said distance and times.

23. The crash-safe vehicle control system according to claim 21, wherein the crash-safe control device is operable to control a moment of initiation of an operation of the operating device such that the moment of initiation when the estimated at least one relationship value is relatively small is advanced with respect to that when the estimated at least one relationship value is relatively large.

24. The crash-safe vehicle control system according to claim 21, wherein the crash-safe control device is operable to control the operating device such that an effect to be achieved by the operation of the operating device when the estimated at least one relationship value is relatively small is increased with respect to that when the estimated at least one relationship value is relatively large.

* * * * *

UNITED STATES PATENT AND TRADEMARK OFFICE
CERTIFICATE OF CORRECTION

| | |
|---|---|
| PATENT NO. | : 7,613,568 B2 |
| APPLICATION NO. | : 10/563834 |
| DATED | : November 3, 2009 |
| INVENTOR(S) | : Tomoya Kawasaki |

Page 1 of 1

It is certified that error appears in the above-identified patent and that said Letters Patent is hereby corrected as shown below:

In claim 13, column 45, line 24, "wldthwIse" should read --widthwise--.

In claim 21, column 46, line 54, "fist" should read --first--.

Signed and Sealed this

Sixteenth Day of February, 2010

David J. Kappos
*Director of the United States Patent and Trademark Office*